US011936877B2

(12) United States Patent
Chen et al.

(10) Patent No.: US 11,936,877 B2
(45) Date of Patent: Mar. 19, 2024

(54) TEMPLATE MATCHING BASED AFFINE PREDICTION FOR VIDEO CODING

(71) Applicant: QUALCOMM Incorporated, San Diego, CA (US)

(72) Inventors: Chun-Chi Chen, San Diego, CA (US); Han Huang, San Diego, CA (US); Zhi Zhang, Munich (DE); Yao-Jen Chang, San Diego, CA (US); Yan Zhang, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/715,571

(22) Filed: Apr. 7, 2022

(65) Prior Publication Data

US 2022/0329823 A1 Oct. 13, 2022

Related U.S. Application Data

(60) Provisional application No. 63/173,949, filed on Apr. 12, 2021, provisional application No. 63/173,861, filed on Apr. 12, 2021.

(51) Int. Cl.
*H04N 19/176* (2014.01)
*H04N 19/105* (2014.01)
(Continued)

(52) U.S. Cl.
CPC ......... *H04N 19/137* (2014.11); *H04N 19/105* (2014.11); *H04N 19/132* (2014.11); *H04N 19/176* (2014.11)

(58) Field of Classification Search
CPC ............................ H04N 19/137; H04N 19/105
See application file for complete search history.

(56) References Cited

U.S. PATENT DOCUMENTS 9,781,446 B2 * 10/2017 Francois .............. H04N 19/61
10,701,390 B2 6/2020 Li et al.
(Continued)

FOREIGN PATENT DOCUMENTS

WO WO-2019072373 A1 * 4/2019 ........... H04N 19/513

OTHER PUBLICATIONS

Bordes P., et al., "Description of SDR, HDR and 360° Video Coding Technology Proposal by Qualcomm and Technicolor—Medium Complexity Version," 122. MPEG Meeting, Apr. 16, 2018-Apr. 20, 2018, 10th Meeting, San Diego, US, Apr. 10-20, 2018, (Motion Picture Expert Group or ISO/IEC JTC1/SC29/WG11), No. m42353, Apr. 12, 2018, KP030261572, pp. 1-83, URL: http://phenix.int-evry.fr/mpeg/doc_end_user/documents/122_San%20Diego/wg11/m42353-JVET-J0022-v3-JVET-J0022-v3.zip JVET-J0022_r1.docx.
(Continued)

*Primary Examiner* — Irfan Habib
(74) *Attorney, Agent, or Firm* — Shumaker & Sieffert, PA

(57) ABSTRACT

A video decoder can be configured to determine that a current block in a current picture of the video data is coded in an affine prediction mode; determine one or more control-point motion vectors (CPMVs) for the current block; identify an initial prediction block for the current block in a reference picture using the one or more CPMVs; determine a current template for the current block in the current picture; and determine an initial reference template for the initial prediction block in the reference picture; and perform a motion vector refinement process to determine a modified prediction block based on a comparison of the current template to the initial reference template.

30 Claims, 15 Drawing Sheets

REFERENCE FRAME

CURRENT FRAME

(51) Int. Cl.
*H04N 19/132* (2014.01)
*H04N 19/137* (2014.01)

(56) References Cited

U.S. PATENT DOCUMENTS

| | | | | |
|---|---|---|---|---|
| 10,869,042 | B2* | 12/2020 | Zhang | H04N 19/105 |
| 11,368,676 | B2* | 6/2022 | Xiu | H04N 19/105 |
| 11,405,605 | B2* | 8/2022 | Piao | H04N 19/159 |
| 11,758,151 | B2* | 9/2023 | Chen | H04N 19/82 375/240.16 |
| 2016/0286230 | A1* | 9/2016 | Li | H04N 19/176 |
| 2017/0195685 | A1* | 7/2017 | Chen | H04N 19/537 |
| 2017/0332095 | A1* | 11/2017 | Zou | H04N 19/537 |
| 2018/0098063 | A1* | 4/2018 | Chen | H04N 19/52 |
| 2018/0098089 | A1* | 4/2018 | Chen | H04N 19/70 |
| 2018/0131960 | A1* | 5/2018 | Wang | H04N 19/523 |
| 2018/0249154 | A1* | 8/2018 | Chuang | H04N 19/567 |
| 2018/0270500 | A1 | 9/2018 | Li et al. | |
| 2019/0007699 | A1* | 1/2019 | Liu | H04N 19/139 |
| 2019/0104319 | A1* | 4/2019 | Zhang | H04N 19/105 |
| 2019/0149838 | A1* | 5/2019 | Zhang | H04N 19/54 375/240.16 |
| 2020/0154124 | A1* | 5/2020 | Lee | H04N 19/105 |
| 2020/0195956 | A1* | 6/2020 | Robert | H04N 19/52 |
| 2020/0288163 | A1* | 9/2020 | Poirier | H04N 19/147 |
| 2020/0336738 | A1* | 10/2020 | Xiu | G06F 17/18 |
| 2020/0359045 | A1* | 11/2020 | Liu | H04N 19/184 |
| 2020/0382807 | A1* | 12/2020 | Liu | H04N 19/56 |
| 2021/0051329 | A1 | 2/2021 | Ko et al. | |
| 2021/0203947 | A1* | 7/2021 | He | H04N 19/159 |
| 2021/0211711 | A1* | 7/2021 | Lee | H04N 19/52 |
| 2022/0103810 | A1* | 3/2022 | Park | H04N 19/105 |
| 2022/0124312 | A1* | 4/2022 | Park | H04N 19/137 |
| 2022/0210413 | A1* | 6/2022 | Zeng | H04N 19/52 |
| 2022/0239922 | A1* | 7/2022 | Solovyev | H04N 19/30 |
| 2023/0091809 | A1* | 3/2023 | Lee | A61N 1/36038 |
| 2023/0232012 | A1* | 7/2023 | Lai | H04N 19/176 375/240.02 |

OTHER PUBLICATIONS

Bross B., et al., "Versatile Video Coding (Draft 10)," Joint Video Experts Team (JVET) of ITU-T SG 16 WP 3 and ISO/IEC JTC 1/SC 29/WG 11, 131 MPEG Meeting, 19th JVET Meeting, by Teleconference, Jun. 22-Jul. 1, 2020, Online, (Motion Picture Expert Group or ISO/IEC JTC1/SC29/WG11), No. JVET-S2001-vH, XP030293002, 548 Pages.

Bross B., et al., "Versatile Video Coding Editorial Refinements on Draft 10," JVET-T2001-v2, 20. JVET Meeting, Jan. 7, 2020-Oct. 16, 2020, Teleconference, (The Joint Video Experts Team of ISO/IEC JTC1/SC29/WG11 and ITU-T SG 16), Nov. 24, 2020 (Nov. 24, 2020), pp. 1-515, XP030293334, Retrieved from the Internet: URL: https://jvet-experts.org/doc_end_user/documents/20_Teleconference/wg11/JVET-T2001-v2.zip, JVET-T2001-v2.docx, [retrieved on Nov. 24, 2020].

Chang Y-J., et al., "Compression Efficiency Methods Beyond VVC," 21st JVET Meeting, JVET of ITU-T SG 16 WP 3 and ISO/IEC JTC1/SC29/WG11, No. JVET-U0100, by teleconference, Jan. 6-15, 2021, Dec. 31, 2020, XP030293237, Jan. 11, 2021-Jan. 15, 2021, Online, 133rd MPEG Meeting, (Motion Picture Expert Group or ISO/IEC JTC1/SC29/WG11), No. m55890, XP030290689, pp. 1-13, https://jvet-experts.org/doc_end_user/documents/21_Teleconference/wg11/JVET-U0100-v1.zip.

Chen C-C (Qualcomm) et al., "EE2-Related: Extension of Template Matching to Affine, CIIP, GPM Merge Modes, and Boundary Sub-Blocks," 22. JVET Meeting, Apr. 20, 2021-Apr. 28, 2021, Teleconference, (The Joint Video Exploration Team of ISO/IEC JTC1/SC29/WG11 and ITU-T SG.16), No. JVET-V0118, m56532, Apr. 14, 2021 (Apr. 14, 2021), pp. 1-3, XP030294297, URL: https://jvet-experts.org/doc_end_user/documents/22_Teleconference/wg11/JVET-V0118-v1.zip JVET-V0118-v1.docx.

Chen J., et al., "Algorithm Description for Versatile Video Coding and Test Model 11 (VTM 11)," JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-55.

Han W-J., et al., "Improved Video Compression Efficiency Through Flexible Unit Representation and Corresponding Extension of Coding Tools," IEEE Transactions on Circuits and Systems for Video Technology, vol. 20, No. 12, Dec. 2010, pp. 1709-1720.

International Search Report and Written Opinion—PCT/US2022/024024—ISA/EPO—dated Jul. 20, 2022 12 pp.

ITU-T H.265, "Series H: Audiovisual and Multimedia Systems, Infrastructure of Audiovisual Services—Coding of Moving Video, High efficiency Video Coding," The International Telecommunication Union, Dec. 2016, 664 Pages.

ITU-T H.266: "Series H: Audiovisual and Multimedia Systems Infrastructure of Audiovisual Services—Coding of Moving Video," Versatile Video Coding, The International Telecommunication Union, Aug. 2020, 516 pages.

Leannec F.L., et al., "Asymmetric Coding Units in QTBT," 4. JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/, JEVT-D0064-r1, Oct. 10, 2016 (Oct. 10, 2016), pp. 1-10, Oct. 15, 2016-Oct. 21, 2016, XP055417365, Chengdu, CN, Retrieved from the Internet: URL: file:///C:/data-heising/MPEG/JEVT_ D0064_100ct17.pdf [retrieved on Oct. 19, 2017].

Li L., et al., "An Affine Motion Compensation Framework for High Efficiency Video Coding," 2015 IEEE International Symposium on Circuits and Systems (ISCAS), Lisbon, 2015, pp. 525-528.

Lowe D.G., "Distinctive Image Features from Scale-Invariant Key Points," International Journal of Computer Vision, vol. 60, No. 2, Jan. 5, 2004, XP055203065, pp. 91-110.

Seregin V., et al., "Exploration Experiment on Enhanced Compression Beyond VVC Capability," 21. JVET Meeting, Jan. 6, 2021-Jan. 15, 2021, Teleconference, (The Joint Video Exploration Team of ISO/IEC JTC1/SC29/WG11 and ITU-T SG.16), No. JVET-U2024-V2, m56284 Feb. 17, 2021, XP030293402, pp. 1-19, Retrieved from the Internet: URL: https://jvet-experts.org/doc_end_user/documents/21_Teleconference/wg11/JVET-U2024-v2.zip JVET-U2024-v2_clean.docx.

Sullivan G.J., et al., "Overview of the High Efficiency Video Coding (HEVC) Standard," IEEE Transactions on Circuits and Systems for Video Technology, IEEE Service Center, Piscataway, NJ, US, vol. 22, No. 12, Dec. 1, 2012, XP011487803, pp. 1649-1668.

Wang Y-K., et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, 25 Jul.-Aug. 2, 2013, 311 pages.

* cited by examiner

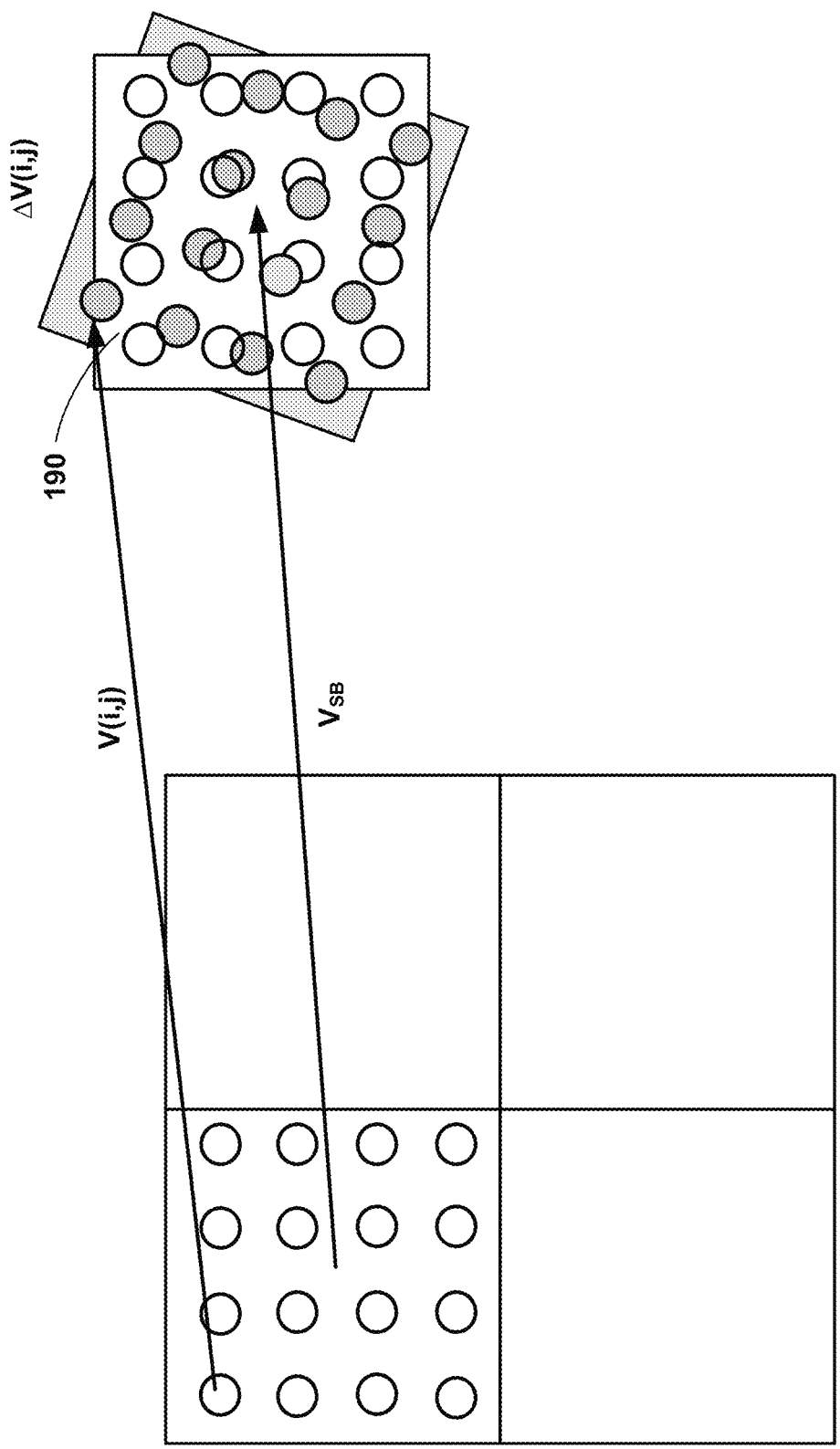

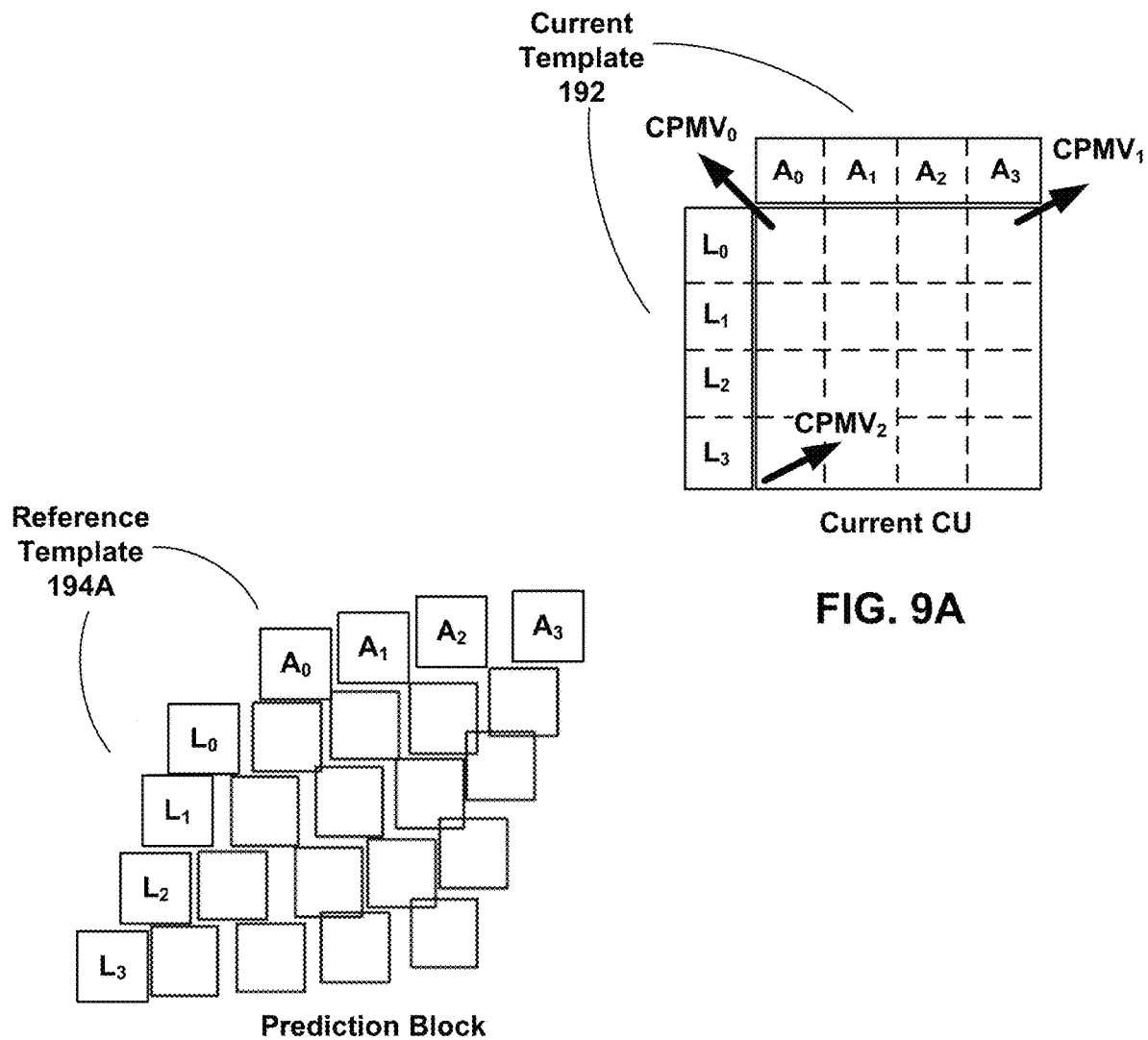
Current CU
FIG. 9A
Reference Template 194A
Prediction Block
FIG. 9B
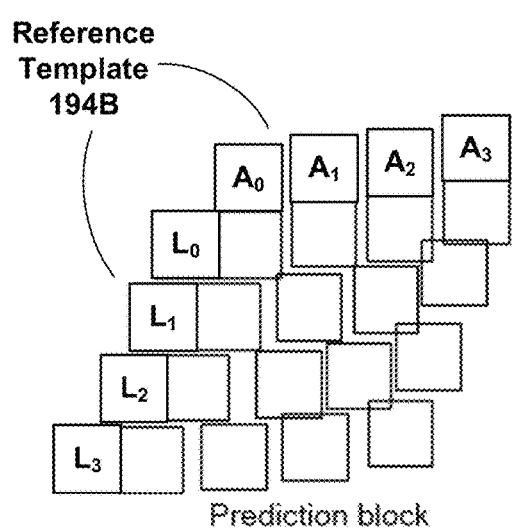
FIG. 9C

FIG. 10

TEMPLATE MATCHING BASED AFFINE PREDICTION FOR VIDEO CODING

This application claims the benefit of U.S. Provisional Patent Application No. 63/173,861, filed 12 Apr. 2021 and U.S. Provisional Patent Application No. 63/173,949, filed 12 Apr. 2021, the entire content of each being incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

This disclosure describes techniques related to affine prediction modes, which are types of inter prediction modes that potentially account for rotation of objects that can occur in a series of pictures. An affine motion model of a block can be determined based on motion vectors of control points of the block, which may be referred to as control-point motion vectors (CPMVs). In some implementations, the control points of the block are the top-left and top-right corners of the block. In some implementations, the control points of the block further include the bottom-left corner of the block. A video coder (i.e., a video encoder or a video decoder) may calculate motion vectors of sub-blocks of the block based on the CPMVs of the block to locate prediction sub-blocks in a reference picture. The prediction sub-blocks may form a prediction block.

This disclosure describes decoder-side techniques that may refine the prediction sub-blocks, and hence the prediction block. That is, the techniques of this disclosure may result in the video decoder forming a prediction block using sub blocks that are different than the sub blocks initially determined, or located, using the CPMVs. By performing a motion vector refinement process to determine a modified prediction block for an affine coded block in the manner described in this disclosure, a video decoder may determine a more accurate prediction block compared to conventional affine prediction. Determining a more accurate prediction block utilizing the techniques of this disclosure may improve overall coding quality without increasing signaling overhead.

According to one example of this disclosure, a method of decoding video data includes determining that a current block in a current picture of the video data is coded in an affine prediction mode; determining one or more control-point motion vectors (CPMVs) for the current block; identifying an initial prediction block for the current block in a reference picture using the one or more CPMVs; determining a current template for the current block in the current picture; determining an initial reference template for the initial prediction block in the reference picture; and performing a motion vector refinement process to determine a modified prediction block based on a comparison of the current template to the initial reference template.

According to another example of this disclosure, a device for decoding video data includes a memory and one or more processors implemented in circuitry, coupled to the memory, and configured to: determine that a current block in a current picture of the video data is coded in an affine prediction mode; determine one or more control-point motion vectors (CPMVs) for the current block; identify an initial prediction block for the current block in a reference picture using the one or more CPMVs; determine a current template for the current block in the current picture; determine an initial reference template for the initial prediction block in the reference picture; and perform a motion vector refinement process to determine a modified prediction block based on a comparison of the current template to the initial reference template.

According to another example of this disclosure, a computer-readable storage medium stores instructions that when executed by one or more processors cause the one or more processors to: determine that a current block in a current picture of the video data is coded in an affine prediction mode; determine one or more control-point motion vectors (CPMVs) for the current block; identify an initial prediction block for the current block in a reference picture using the one or more CPMVs; determine a current template for the current block in the current picture; determine an initial reference template for the initial prediction block in the reference picture; and perform a motion vector refinement process to determine a modified prediction block based on a comparison of the current template to the initial reference template.

According to another example of this disclosure, a, apparatus for decoding video data includes means for determining that a current block in a current picture of the video data is coded in an affine prediction mode; means for determining one or more control-point motion vectors (CPMVs) for the current block; means for identifying an initial prediction block for the current block in a reference picture using the one or more CPMVs; means for determining a current template for the current block in the current picture; means for determining an initial reference template for the initial prediction block in the reference picture; and means for performing a motion vector refinement process to determine a modified prediction block based on a comparison of the current template to the initial reference template.

The details of one or more examples are set forth in the accompanying drawings and the description below. Other features, objects, and advantages will be apparent from the description, drawings, and claims.

BRIEF DESCRIPTION OF DRAWINGS

FIG. 8 shows an example of a subblock motion vector.

FIGS. 9A-9C show a current template block and reference template block.

FIG. 10 is a conceptual diagram illustrating examples of per-sample weights that may be assigned to samples of neighboring blocks for calculating template matching costs.

DETAILED DESCRIPTION

Figure 1:
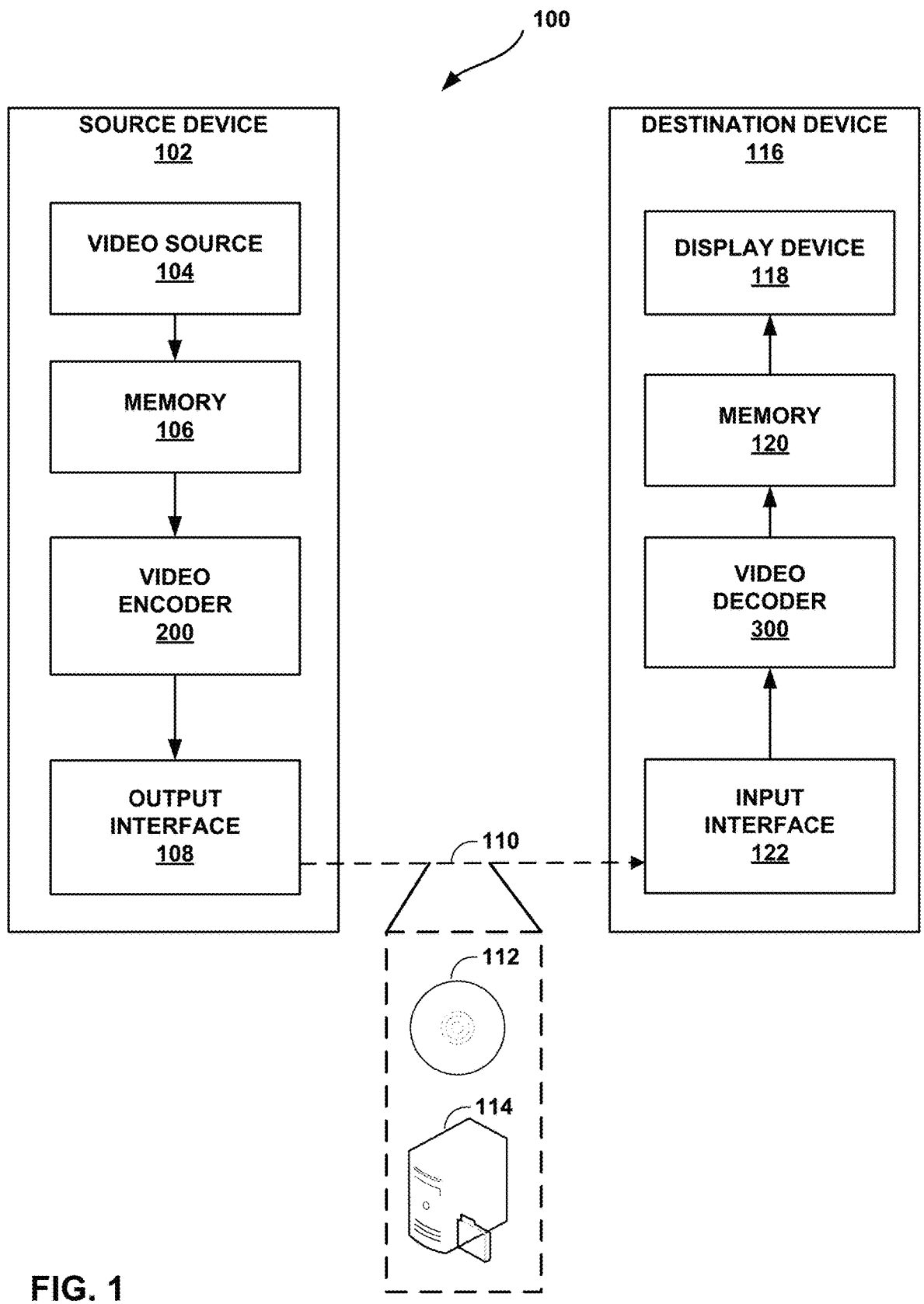
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

This disclosure describes techniques related to affine prediction modes, which are types of inter prediction modes that potentially account for rotation of objects that can occur in a series of pictures. An affine motion model of a block can be determined based on motion vectors of control points of the block, which may be referred to as control-point motion vectors (CPMVs). In some implementations, the control points of the block are the top-left and top-right corners of the block. In some implementations, the control points of the block further include the bottom-left corner of the block. A video coder (i.e., a video encoder or a video decoder) may calculate motion vectors of sub-blocks of the block based on the CPMVs of the block to locate prediction sub-blocks in a reference picture. The prediction sub-blocks may form a prediction block.

This disclosure describes decoder-side techniques that may refine the prediction sub-blocks, and hence the prediction block. That is, the techniques of this disclosure may result in the video decoder forming a prediction block using sub blocks that are different than the sub blocks initially determined, or located, using the CPMVs. By performing a motion vector refinement process to determine a modified prediction block for an affine coded block in the manner described in this disclosure, a video decoder may determine a more accurate prediction block compared to conventional affine prediction. Determining a more accurate prediction block utilizing the techniques of this disclosure may improve overall coding quality without increasing signaling overhead.

Although the techniques of this disclosure are generally described as being performed by a video decoder, it should be understood that the techniques described herein may also be performed by a video encoder. For example, the techniques of this disclosure may be performed by a video encoder as part of a process for determining how to encode a video block and for generating reference pictures that may be used to encode subsequent picture of video.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for performing template-based affine prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for performing template-based affine prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively or additionally, video encoder 200 and video decoder 300 may operate according to other proprietary or industry standards, such as ITU-T H.266, also referred to as Versatile Video Coding (VVC), and extensions thereto such as extensions for screen content or high dynamic range. A draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 18$^{th}$ Meeting: by teleconference, 22 Jun.-1 Jul. 2020, JVET-S2001-v17 (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block. In this disclosure, a current block or current picture generally refers to a block or picture that is currently being encoded or decoded, as opposed to an already decoded block or picture or a yet-to-be-decoded block or picture.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU has 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
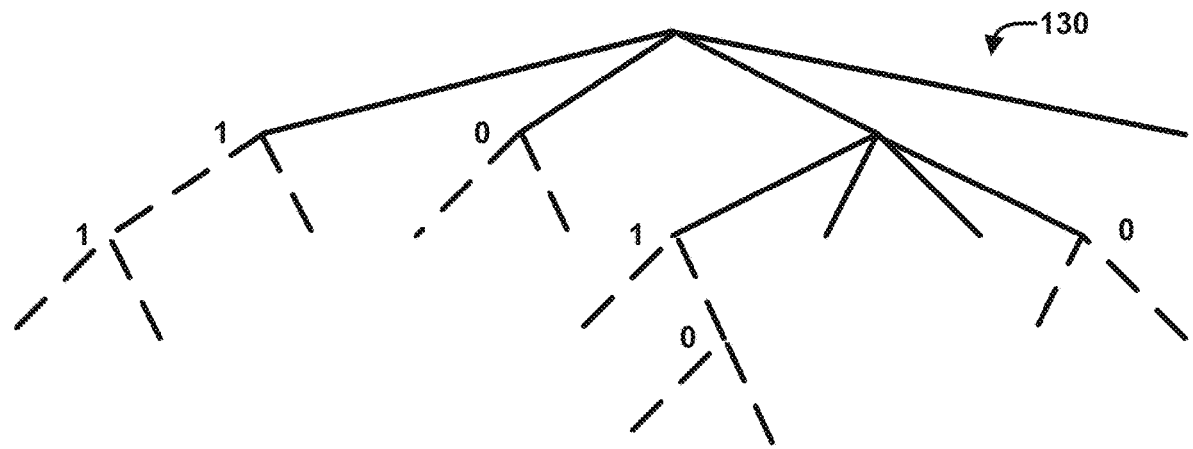
FIGS. 2A and 2B are conceptual diagrams illustrating an example quadtree binary tree (QTBT) structure, and a corresponding coding tree unit (CTU).
Figure 2B:
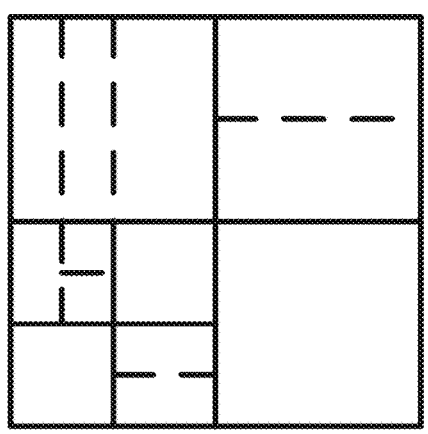

FIGS. 2A and 2B are conceptual diagrams illustrating an example quadtree binary tree (QTBT) structure 130, and a corresponding CTU 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBT Size, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a CU, which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, then the leaf quadtree node may not be further split by the binary tree, because the size exceeds the MaxBTSize (i.e., 64×64, in this example). Otherwise, the quadtree leaf node may be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

As introduced above, video encoder 200 and video decoder 300 may be configured to perform motion vector prediction. In HEVC, there are two inter prediction modes, named merge (skip is considered as a special case of merge) and AMVP modes, respectively, for a prediction unit (PU). In AMVP and merge mode, video encoder 200 and video decoder 300 maintain a motion vector (MV) candidate list for multiple motion vector predictors. The motion vector(s), as well as reference indices in the merge mode, of the current PU are generated by selecting one candidate from the MV candidate list.

In the implementation of HEVC, the MV candidate list contains up to five candidates for the merge mode and two candidates for the AMVP mode. A merge candidate may contain a set of motion information, e.g., motion vectors corresponding to both reference picture lists (list 0 and list 1) and the reference indices. By receiving a merge candidate identified by a merge index, video decoder 300 determines the reference pictures used for the prediction of the current blocks, as well as the associated motion vectors. On the other hand, under AMVP mode for each potential prediction direction from either list 0 or list 1, video decoder 300 receives a MV predictor (MVP) index to the MV candidate list because the AMVP candidate contains only a motion vector. Video decoder 300 additionally receives a motion vector difference (MVD) and a reference index to explicitly identify a reference picture. In AMVP mode, the predicted motion vectors can be further refined.

The candidates for both modes are derived similarly from the same spatial and temporal neighboring blocks. In HEVC, video encoder 200 and video decoder 300 may derive spatial MV candidates from the neighboring blocks, as shown in FIG. 3A and FIG. 3B, for a specific PU ($PU_0$), although the techniques for generating the candidates from the blocks differ for merge and AMVP modes.

Figure 3B:
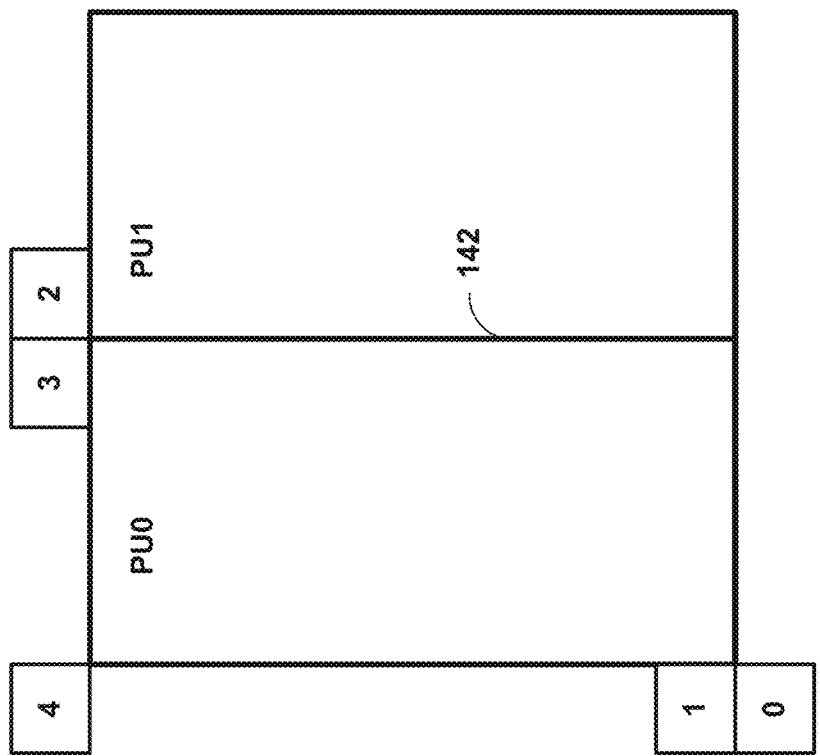
FIG. 3B is a conceptual diagram illustrating spatial neighboring motion vector candidates for advanced motion vector prediction (AMVP) mode.
Figure 3A:
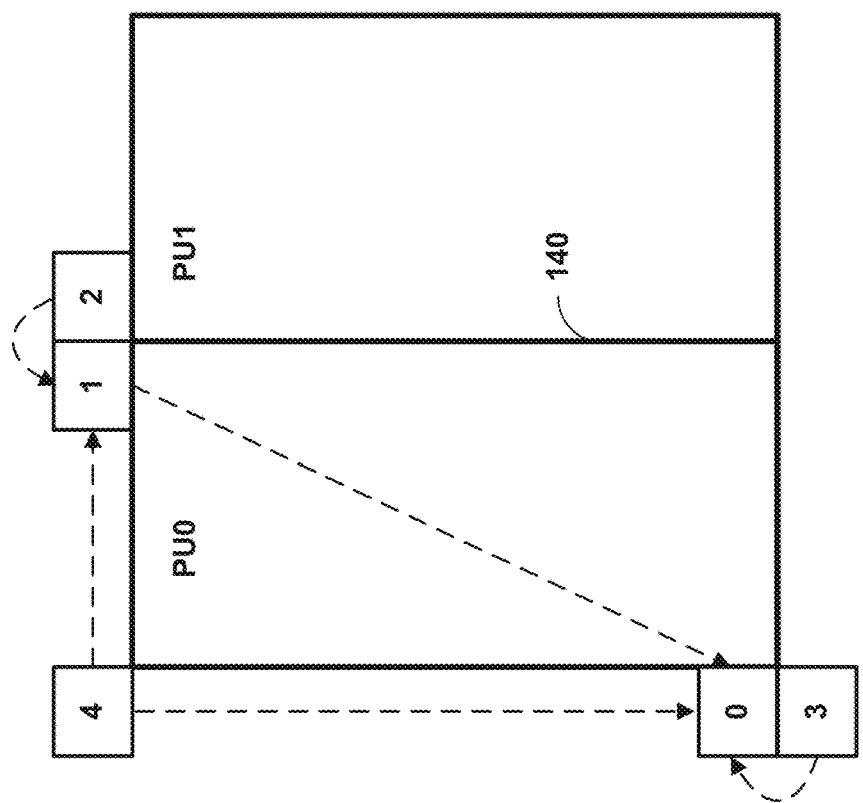
FIG. 3A is a conceptual diagram illustrating spatial neighboring motion vector candidates for merge mode.

FIG. 3A is a conceptual diagram showing spatial neighboring candidates of block 140 for merge mode. FIG. 3B is a conceptual diagram showing spatial neighboring candidates of block 142 for AMVP mode. In merge mode, video encoder 200 and video decoder 300 may derive up to four spatial MV candidates in the order shown in FIG. 3A. The order is the following: a left block (0, A1), an above block (1, B1), an above-right block (2, B0), a below-left block (3, A0), and an above-left (4, B2) block.

In AMVP mode, video encoder 200 and video decoder 300 may divide the neighboring blocks into two groups: a left group including blocks 0 and 1, and an above group include blocks 2, 3, and 4, as shown in FIG. 3B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, video encoder 200 and video decoder 300 may scale the first available candidate to form the final candidate. Thus, the temporal distance differences can be compensated.

Temporal motion vector prediction in HEVC will now be discussed. Video encoder 200 and video decoder 300 may be configured to add a temporal motion vector predictor (TMVP) candidate, if enabled and available, into the MV candidate list after spatial motion vector candidates. The process of motion vector derivation for TMVP candidate is the same for both merge and AMVP modes. However, in HEVC, the target reference index for the TMVP candidate in the merge mode is set to 0.

Figures 4A, 4B:
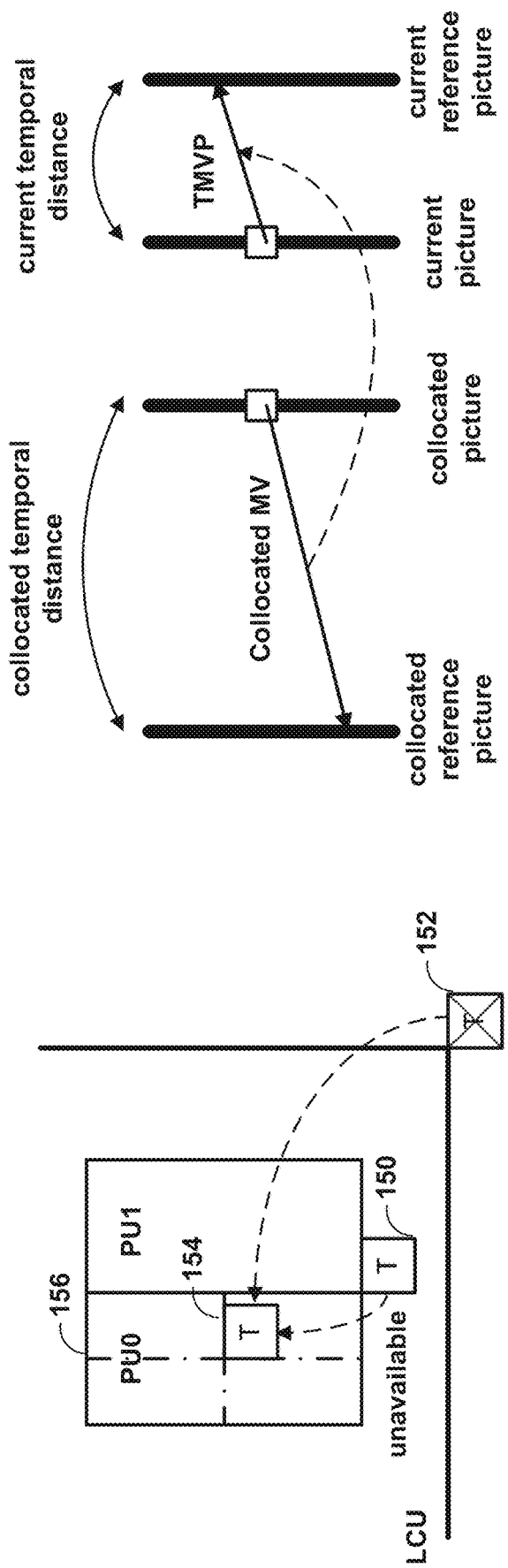
FIG. 4A is a conceptual diagram illustrating temporal motion vector candidates.
FIG. 4B is a conceptual diagram illustrating motion vector scaling.

FIG. 4A shows example TMVP candidates for block 154 (PU0) and FIG. 4B shows motion vector scaling process 156. The primary block location for TMVP candidate derivation is the bottom right block outside of the collocated PU. This candidate is shown in FIG. 4A as a block "T." The location of block T is used to compensate the bias to the above and left blocks used to generate spatial neighboring candidates. However, if that block is located outside of the current CTB row or motion information is not available, the block is substituted with a center block of the PU.

Video encoder 200 and video decoder 300 may derive a motion vector for the TMVP candidate from the co-located PU of the co-located picture, indicated in the slice level. The motion vector for the co-located PU is called a collocated MV. Similar to temporal direct mode in AVC, to derive the TMVP candidate motion vector, the co-located MV may be scaled to compensate the temporal distance differences, as shown in FIG. 4B.

Other Aspects of Motion Prediction in HEVC related to the techniques described herein will now be described. Video encoder 200 and video decoder 300 may be configured to perform motion vector scaling. It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, the associated containing picture may be different than the reference picture. Therefore, video encoder 200 and video decoder 300 may calculate a new distance, based on POC. Video encoder 200 and video decoder 300 may scale the motion vector based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Video encoder 200 and video decoder 300 may be configured to perform artificial motion vector candidate generation. If a motion vector candidate list is not complete, artificial motion vector candidates are generated and inserted at the end of the list until the list is full.

In merge mode, there are two types of artificial MV candidates: combined candidate derived only for B-slices and zero candidates used only for AMVP if the first type does not provide enough artificial candidates. For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Video encoder 200 and video decoder 300 may be configured to perform a pruning process for candidate insertion. Candidates from different blocks may happen to be the same, which decreases the efficiency of a merge/AMVP candidate list. A pruning process is applied to solve this problem. When implementing the pruning process, video encoder 200 or video decoder 300 compares one candidate against the others in the current candidate list to avoid inserting identical candidate in certain extent. To reduce the complexity, only limited numbers of pruning process is applied instead of comparing each potential one with all the other existing ones.

Video encoder 200 and video decoder 300 may be configured to perform template matching prediction. Template matching prediction is a special merge mode based on Frame-Rate Up Conversion (FRUC) techniques. With this mode, partial motion information of a block is not signaled but derived at the decoder side. Template matching may be applied to both AMVP mode and regular merge mode. In AMVP mode, MVP candidate selection is determined based on template matching to pick up the one which reaches the minimal difference between current block template and reference block template. In regular merge mode, a template matching mode flag is signaled to indicate the use of template matching. Then, video encoder 200 and video decoder 300 may apply template matching to the merge candidate indicated by merge index for MV refinement.

Figure 5:
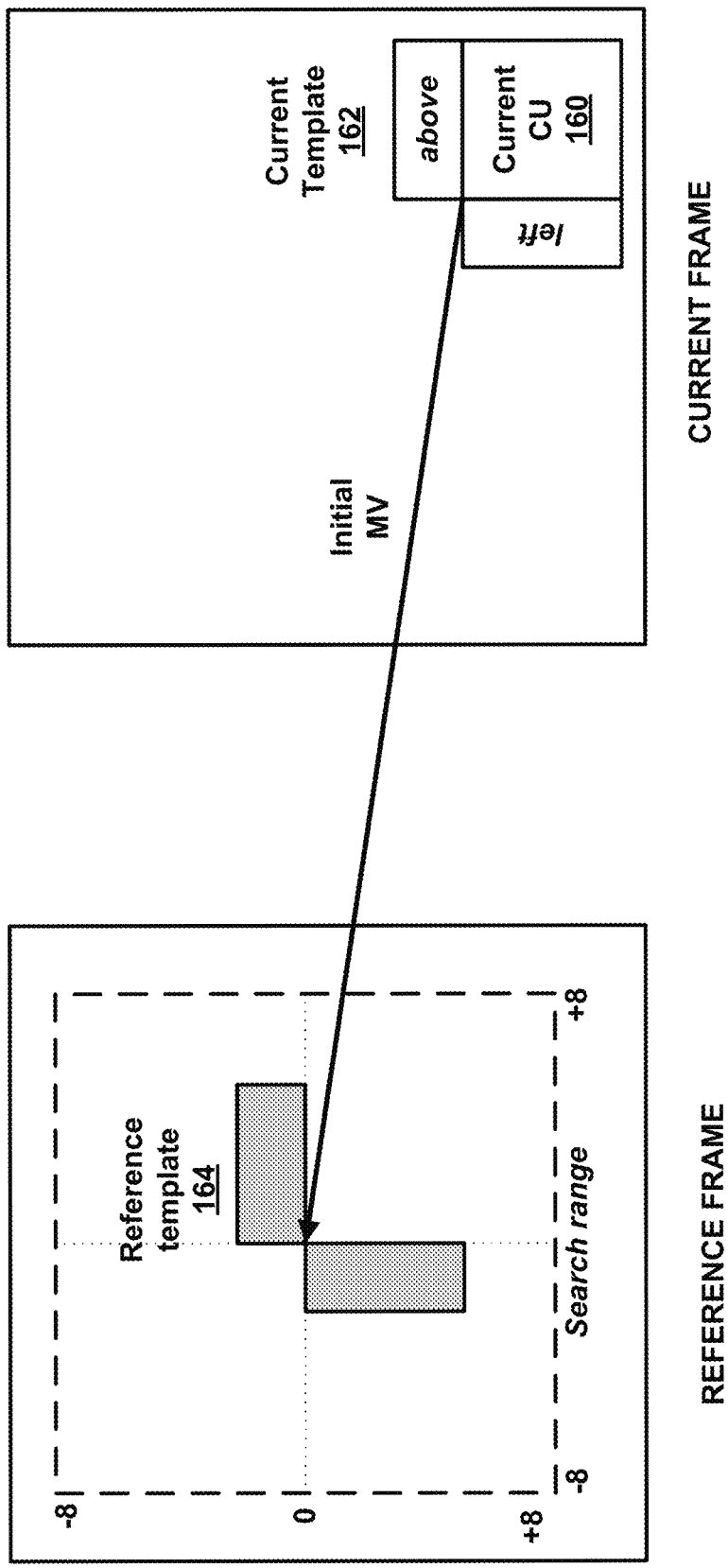
FIG. 5 shows an example of template matching performed on a search area around an initial motion vector.

As shown in FIG. 5, template matching is used to derive motion information of current CU 160 by finding the closest match between a current template 162 in the current picture and a reference template 164 (same size to the template) in a reference picture. With an AMVP candidate selected based on initial matching error, video encoder 200 and video decoder 300 may refine the MVP using template matching. With a merge candidate indicated by signaled merge index, video encoder 200 and video decoder 300 may be configured to refine MVs corresponding to L0 and L1 independently by template matching and then further refine the less accurate MV based on the more accurate MV.

Video encoder 200 and video decoder 300 may be configured to determine a cost function. When a motion vector points to a fractional sample position, motion compensated interpolation is needed. To reduce complexity, bi-linear interpolation instead of regular 8-tap DCT-IF interpolation may be used for template matching to generate templates on reference pictures. The matching cost C of template matching is calculated as follows:

$$C = SAD + w * (|MV_x - MV_x^s| + |MV_y - MV_y^s|),$$

where w is a weighting factor which can be set to an integer number such as 0, 1, 2, 3 or 4, MV and MV$^s$ indicate the currently testing MV and the initial MV (i.e., a MVP candidate in AMVP mode or merged motion in merge mode), respectively. SAD is used as the matching cost of template matching.

When template matching is used, video encoder 200 and video decoder 300 may be configured to refine the motion using luma samples only. The derived motion may be used for both luma and chroma for motion compensated (MC) inter prediction. After MV is decided, final MC is performed using 8-taps interpolation filter for luma and 4-taps interpolation filter for chroma.

Video encoder 200 and video decoder 300 may be configured to determine and implement a search process. MV refinement is a pattern-based MV search with the criterion of template matching cost and a hierarchical structure. Two search patterns are supported—a diamond search and a cross search for MV refinement. The hierarchical structure specifies an iterative process to refine MV, starting at a coarse MVD precision (e.g., quarter-pel) and ending at a fine one (e.g., ⅛-pel). The MV is directly searched at quarter luma sample MVD precision with diamond pattern, followed by quarter luma sample MVD precision with cross pattern, and then this is followed by one-eighth luma sample MVD refinement with cross pattern. The search range of MV refinement is set equal to (−8, +8) luma samples around the initial MV. When the current block is of bi-prediction, both MVs are refined independently, and then the best of which (in terms of matching cost) is set as a prior to further refine the other MV with BCW weight values.

Figure 6B:
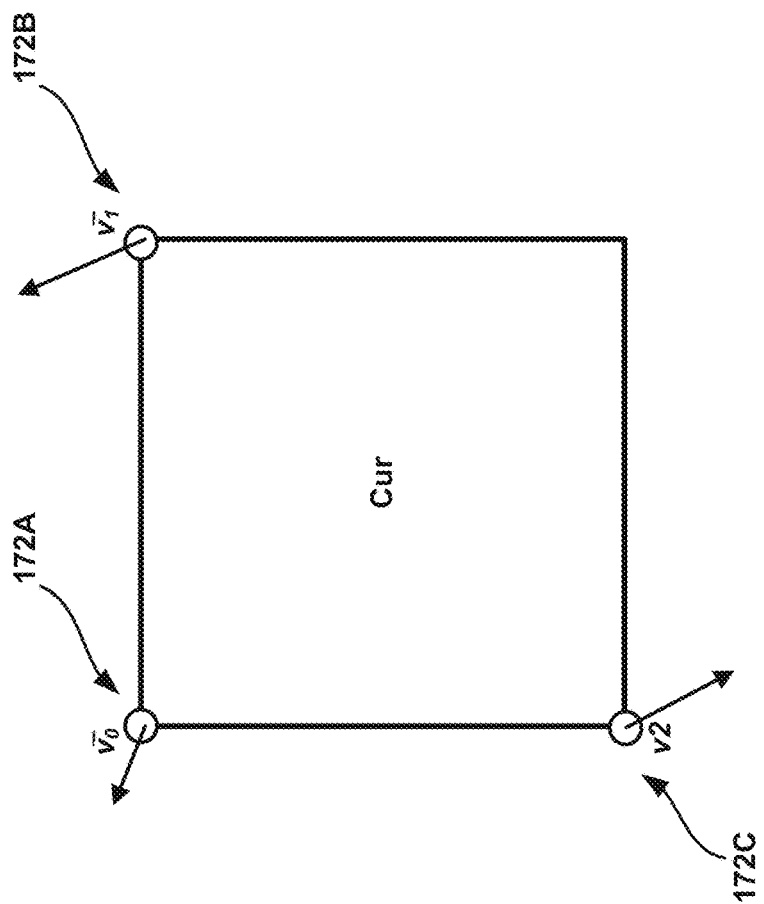
FIG. 6B is a conceptual diagram illustrating a control point based, 4-parameter affine motion model.
Figure 6A:
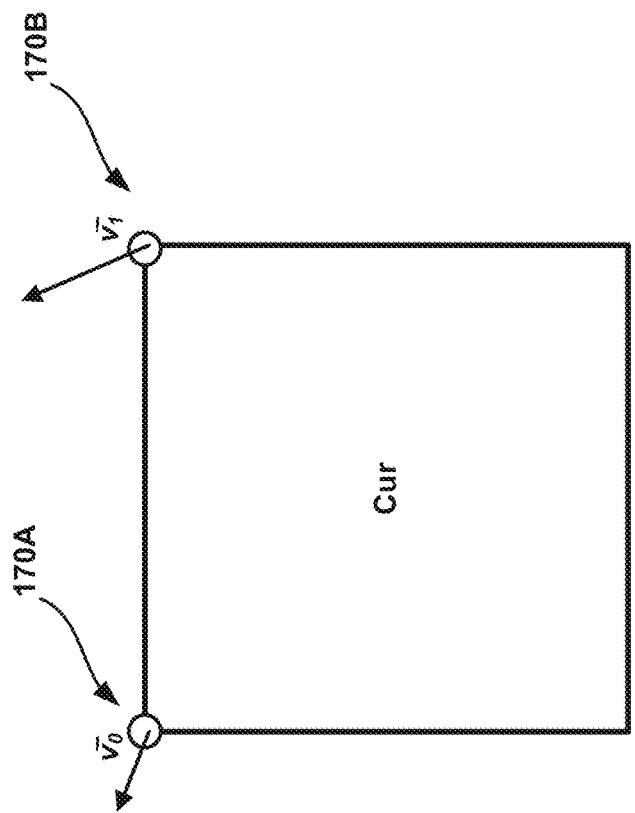
FIG. 6A is a conceptual diagram illustrating a control point based, 6-parameter affine motion model.

Video encoder 200 and video decoder 300 may be configured to perform affine prediction. In HEVC, only translation motion model is applied for motion compensation prediction (MCP). While in the real world, there are many kinds of motion, e.g. zoom in/out, rotation, perspective motions and the other irregular motions. In the VTM-6, a block-based affine transform motion compensation prediction is applied. As shown FIG. 6A, the affine motion field of the block is described by motion information of two control points (170A and 170B), also referred to as a 4-parameter model. As shown FIG. 6B, the affine motion field of the block is described by motion information of three control points (172A-172C) and three control point motion vectors, which is also referred to as a 6-parameter model.

For 4-parameter affine motion model, a motion vector at sample location (x, y) in a block is derived as:

$$\begin{cases} mv_x = \frac{mv_{1x} - mv_{0x}}{W}x + \frac{mv_{1y} - mv_{0y}}{W}y + mv_{0x} \\ mv_y = \frac{mv_{1y} - mv_{0y}}{W}x + \frac{mv_{1y} - mv_{0x}}{W}y + mv_{0y} \end{cases} \quad (2\text{-}1)$$

For 6-parameter affine motion model, a motion vector at sample location (x, y) in a block is derived as:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases} \quad (2\text{-}2)$$

In the equations above, ($mv_{0x}$, $mv_{0y}$) represents the CPMV of the top-left corner, and ($mv_{1x}$, $mv_{1y}$) and ($mv_{2x}$, $mv_{2y}$) represent CPMVs of the top-right and bottom-left corners, respectively.

Figure 7:
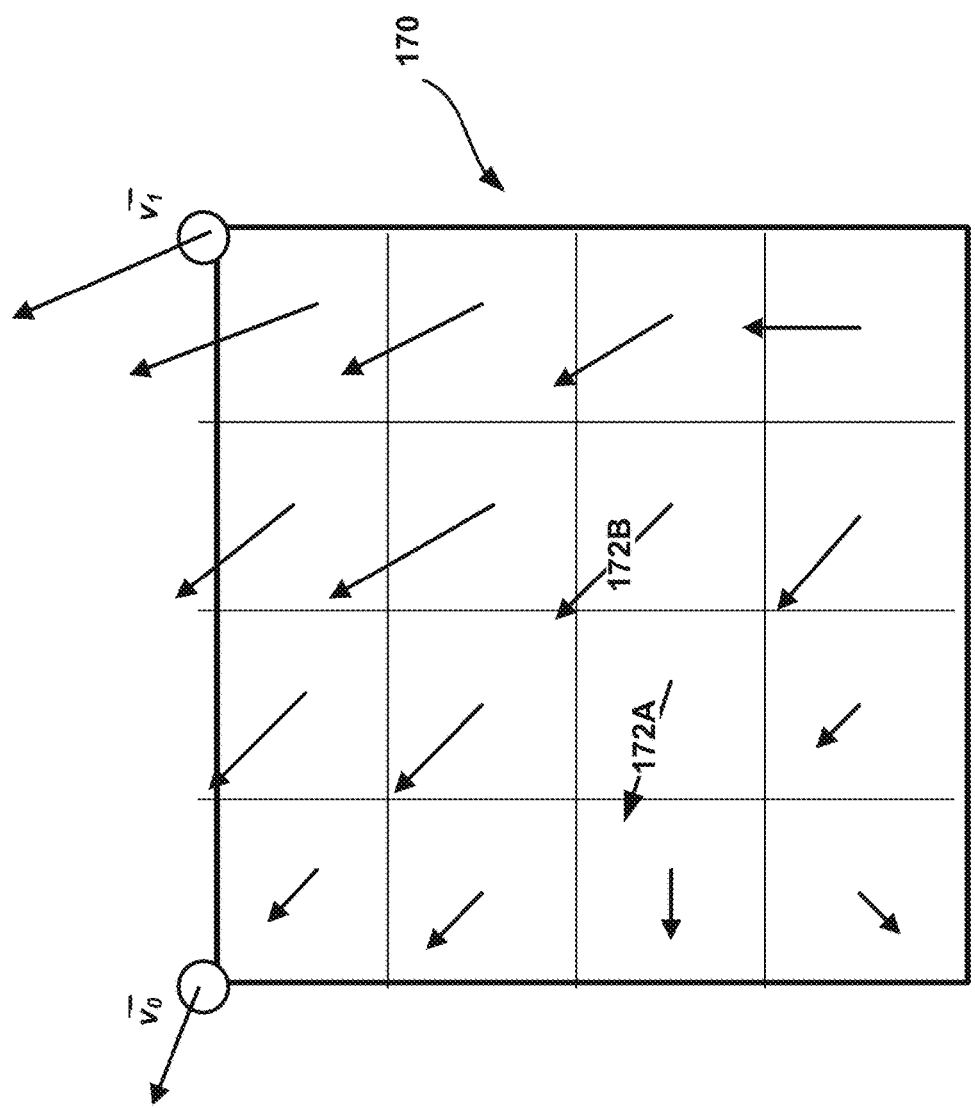
FIG. 7 shows an example of an affine motion vector field per sub-block.

To simplify the motion compensation prediction, video encoder 200 and video decoder 300 may be configured to apply block-based affine transform prediction. FIG. 7 shows block 170, which is a 16×16 luma block that includes 16 4×4 luma sub-blocks. To derive a motion vector for each 4×4 luma sub-block, video encoder 200 and video decoder 300 calculates the motion vector of the center sample of each sub-block, as shown in FIG. 7, according to the above equations, and rounded to ¹⁄₁₆ fraction accuracy. Arrows 172A and 172B identify two of the sixteen motion vectors for the sub-blocks. The other 14 arrows also correspond to motion vectors but are not labeled in FIG. 7. The motion compensation interpolation filters are applied to generate the prediction of each sub-block with derived motion vector. The sub-block size of chroma-components is also set to be 4×4. The MV of a 4×4 chroma sub-block is calculated as the average of the MVs of the four corresponding 4×4 luma sub-blocks.

Video encoder 200 and video decoder 300 may be configured to perform prediction refinement with optical flow for affine mode. Prediction refinement with optical flow (PROF) is used to refine the subblock based affine motion compensated prediction without increasing the memory access bandwidth for motion compensation. In VVC, after the subblock based affine motion compensation is performed, luma prediction sample is refined by adding a difference derived by the optical flow equation.

In one example implementation of PROF, video decoder 300 may be configured to perform the following four steps:

Step 1) The sub-block based affine MC is performed to generate sub-block prediction I(i, j).

Step 2) The spatial gradients $g_x(i, j)$ and $g_y(i, j)$ of the subblock prediction are calculated at each sample location using a 3-tap filter [−1, 0, 1]. The gradient calculation is exactly the same as gradient calculation in BDOF.

$$g_x(i,j)=(I(i+1,j)\text{>>shift1})-(I(i-1,j)\text{>>shift1}),$$

$$g_y(i,j)=(I(i,j+1)\text{>>shift1})-(I(i,j-1)\text{>>shift1}),$$

where shift1 is used to control the gradient's precision. The subblock (e.g., 4×4) prediction is extended by one sample on each side for the gradient calculation. To avoid additional memory bandwidth and additional interpolation computation, those extended samples on the extended borders are copied from the nearest integer pixel position in the reference picture.

Step 3) The luma prediction refinement is calculated by the following optical flow equation:

$$\Delta I(i,j)=g_x(i,j)*\Delta_x(i,j)+g_y(i,j)*\Delta_y(i,j),$$

where the Δv(i, j) is the difference between sample MV computed for sample location (i, j), denoted by v(i, j), and the subblock MV of the subblock to which sample (i, j) belongs, as shown in FIG. 8. The Δv(i, j) is quantized in the unit of ¹⁄₃₂ luma sample precision. FIG. 8 shows a subblock MV $V_{SB}$ and pixel Δv(i, j) (arrow 190).

As the affine model parameters and the sample location relative to the subblock center are not changed from subblock to subblock, Δv(i, j) can be calculated for the first subblock, and reused for other subblocks in the same CU. Let dx(i, j) and dy(i, j) be the horizontal and vertical offset from the sample location (i, j) to the center of the subblock ($x_{SB}$, $y_{SB}$), Δv(i, j) can be derived by the following equations:

$$dx(i,j)=i-x_{SB}$$

$$dy(i,j)=j-y_{SB}$$

$$\Delta v_x(i,j) = C*dx(i,j) + D*dy(i,j)$$

$$\Delta v_y(i,j) = E*dx(i,j) + F*dy(i,j)$$

In order to keep accuracy, the center of the subblock ($x_{SB}$, $y_{SB}$), is calculated as (($W_{SB}$−1)/2, ($H_{SB}$−1)/2), where $W_{SB}$ and $H_{SB}$ are the subblock width and height, respectively.

For 4-parameter affine model, $$C = F = (v_{1x} - v_{0x})/w,$$

$$E = -D = (v_{1y} - v_{0y})/w.$$

For 6-parameter affine model, $$C = (v_{1x} - v_{0x})/w,$$

$$D = (v_{2x} - v_{0x})/h,$$

$$E = (v_{1y} - v_{0y})/w,$$

$$F = (v_{2y} - v_{0y})/h,$$

where ($v_{0x}$, $v_{0y}$), ($v_{1x}$, $v_{1y}$) and ($v_{2x}$, $v_{2y}$) are the top-left, top-right and bottom-left control point motion vectors, w and h are the width and height of the CU.

Step 4) Finally, the luma prediction refinement $\Delta I(i, j)$ is added to the subblock prediction $I(i, j)$. The final prediction $I'$ is generated as the following equation:

$$I'(i,j) = I(i,j) + \Delta I(i,j).$$

PROF is not applied in two cases for an affine coded CU: 1) all control point MVs are the same, which indicates the CU only has translational motion; 2) the affine motion parameters are greater than a specified limit because the subblock based affine MC is degraded to CU based MC to avoid large memory access bandwidth requirement.

Video encoder 200 and video decoder 300 may be configured to apply a fast encoding process to reduce the encoding complexity of affine motion estimation with PROF. PROF is not applied at affine motion estimation stage in following two situations: a) if this CU is not the root block and its parent block is not coded with the affine mode as its best mode, PROF is not applied since the possibility for current CU to use the affine mode as best mode is low; b) if the magnitude of four affine parameters (C, D, E, F) are all smaller than a predefined threshold and the current picture is not a low delay picture, PROF is not applied because the improvement introduced by PROF is small for this case. In this way, the affine motion estimation with PROF can be accelerated.

Existing techniques have several potential problems. The signaling overhead of CPMVs can be significantly increased for a block, when compared with that of a translational model of inter prediction. Thus, decoder-side refinement for CPMVs may improve the accuracy of CPMVs and reduce signaling overhead. This disclosure describes techniques that may address some of these problems.

Template matching based affine prediction (abbreviated hereafter as AffTM) is a decoder-side inter-prediction mode to refine the CPMVs of an affine coded block. Similar to template matching, as described above, video decoder 300 may determine an initial reference template block based on the initially determined CPMVs and then search withing a search area for other reference templates that have a reduced matching cost. Video decoder 300 may then determine the best set of CPMVs to be replacements for initial CPMVs.

Video encoder 200 and video decoder 300 may be configured to determine a reference template block. The samples of reference template blocks are generated on a sub-block basis based on the motion field derived using CPMVs. Under the assumption that a current block and corresponding current template blocks 192 are located within the same affine motion field, video encoder 200 and video decoder 300 can determine MVs of sub-blocks (e.g., $A_0, A_1, \ldots, A_{n-1}$ and $L_0, L_1, \ldots, L_{n-1}$ in FIG. 9A on the current template block 192) using Eq (2-1) or (2-2), where the sample location (x, y) is the centroid of each respective sub-block. Then, video encoder 200 and video decoder 300 fetch or interpolate the samples of sub-blocks for the reference template blocks based on respective sub-block MVs. As illustrated by reference template 194A in the example FIG. 9B illustrates, the reference template sub-blocks need not sit immediately next to any boundary sub-blocks of the prediction block. In addition, the interpolation filter used to generate sub-block samples on a reference template block may be any one or more of the following—no filter (so sub-block MVs are clipped or rounded to integer precision before fetching reference samples), a 2-tap bi-linear filter, a 6-tap DCTIF as in AVC, an 8-tap DCTIF as in HEVC or VVC, or a switchable filter as in VVC.

In another example, as illustrated by reference template 194B in FIG. 9C, the reference template sub-blocks can sit immediately next to boundary sub-blocks of the corresponding prediction block. As such, the MVs of each sub-block ($A_{0, \ldots, n-1}$ and $L_{0, \ldots, n-1}$) are identical to a corresponding immediate neighboring sub-block located on the boundary of the current block.

In another example, MVs of a sub-block other than $A_0$ and $L_0$ on the current template block can be computed through Eq (2-1) or (2-2) at a sample location (x, y) sitting on the centroid between the sub-block itself and its immediately neighboring sub-block on the boundary of the current block. For $A_0$ and $L_0$, the sample location (x, y) can be (0,0) if both $A_0$ and $L_0$ exist, the centroid between $A_0$ and the first sub-block on the current block if only $A_0$ exists, or the centroid between $L_0$ and the first sub-block on the current block if only $L_0$ exists.

In another example, video encoder 200 and video decoder 300 may be configured to apply PROF to a reference template block.

In another example, when all CPMVs are identical to each other, video encoder 200 and video decoder 300 may replace the prediction process of AffTM with that of regular block-based template matching, as described above. One of the CPMVs may be regarded as the initial MV and be used for block-based template matching.

In another example, when all initial CPMVs are identical to each other, video encoder 200 and video decoder 300 may be configured to perform regular block-based template matching, as described above, prior to the AffTM to refine the initial CPMVs. One of the CPMVs may be regarded as the initial MVs for the regular template matching process. This example can be further extended to a translational model search as described above.

Video encoder 200 and video decoder 300 may be configured to perform a search process. This section presents several search processes for AffTM. Without loss of generality, all the algorithms are presented with 6-parameter affine model. These algorithms can be converted for 4-parameter affine mode straightforward by simply removing the bottom-left CPMV from the descriptions. Search range can be predefined or signaled, e.g., ±2, ±4, ±6, ±8 pixels. The initial search point of CPMVs may be any of the following—an AMVP candidate, CPMVs corresponding to a reference picture list of a merge candidate, or CPMVs corresponding to a reference picture list of a block.

Video encoder 200 and video decoder 300 may be configured to perform a square search. Square search applies a square pattern to refine CPMVs of CU in a sequential order, one vector at a time, starting from the top-left CPMV, then top-right one, and ending at bottom-left one. It is noted that bottom-left CPMV is searched only when the CU is of 6 parameter model to have this third CPMV. The square search pattern can be specified as a series of delta motion vectors, dMv={(0,0), (−1,1), (0,1), (1,1), (1,0), (1,−1), (0,−1), (−1,−1), (−1,0)} or any other order based on these nine delta motion vectors. Without loss of generality, this section takes the aforementioned dMv as an example with an initial search step size, so, and a minimal search step size, $s_{min}$, determined according to the indication of AMVR index or 1/16 when the CU is coded by affine AMVP mode and affine merge mode, respectively. The value of so can be set equal to or greater than $s_{min}$ and $s_{i+1}$ is set equal to $s_i$, for all i∈{0, 1, . . . , min}. The square search process is a 7-step process specified as follows:

1. Given a set of search step sizes {$s_0, s_1, \ldots, s_{min}$}, dMv and $mv_0^{(0)}$, $mv_1^{(0)}$, and $mv_2^{(0)}$ representing top-left, top-right and bottom-left CPMVs, respectively, the search process starts at iteration i=0.
2. With $s_i$, dMv and {$mv_0^{(i)}$, $mv_1^{(i)}$, $mv_2^{(i)}$}, the search subprocess starts a sequential process to search $mv_0^{(i)}$ at the beginning, then $mv_1^{(i)}$, and ending at $mv_1^{(i)}$. (It is noted that the sequential order can be {$mv_2^{(i)}$, $mv_1^{(i)}$, $mv_0^{(i)}$} in some examples).
3. With $s_i$, dMv and $mv_0^{(i)}$, the search subprocess computes the respective template matching cost individually for all of these sets of CPMVs: S={$mv_0^{(i)}+d*s_i$, $mv_1^{(i)}$, $mv_2^{(i)}$, for all d∈dMv}. This search subprocess can be denoted as $mv_0^{(i)*}=mv_0^{(i)}+argmin_d\{cost(S_0), cost(S_1), \ldots, cost(S_8)\}*s_i$.
4. Similar to Step 3, the search subprocess computes the respective template matching cost for S={$mv_0^{(i)*}$, $mv_1^{(i)}+d*s_i$, $mv_2^{(i)}$, for all d∈dMv} and the best result is denoted as $mv_1^{(i)*}$.
5. Similar to Step 3, the search subprocess computes the respective template matching cost for S={$mv_0^{(i)*}$, $mv_1^{(i)*}$, $mv_2^{(i)}+d*s_i$, for all d∈dMv} and the best result is denoted as $mv_2^{(i)*}$.
6. Until all CPMVs are searched in Steps 3-5, the output of the search subprocess is {$mv_0^{(i)*}$, $mv_1^{(i)*}$, $mv_2^{(i)*}$}.
   If the search process has visited Step 6 for a number of times over a pre-defined threshold value when search step size is $s_i$, then the search process sets {$mv_0^{(i-1)}$, $mv_1^{(i+1)}$, $mv_2^{(i+1)}$} equal to the subprocess output and goes to Step 7.
   Otherwise, if the subprocess output is exactly identical to {$mv_0^{(i)}$, $mv_1^{(i)}$, $mv_2^{(i)}$)}, then the search process sets {$mv_0^{(i-1)}$, $mv_1^{(i+1)}$, $mv_2^{(i+1)}$} equal to the subprocess output and goes to Step 7.
   Otherwise (if the subprocess output is not exactly identical to {$mv_0^{(i)}$, $mv_1^{(i)}$, $mv_2^{(i)}$}), the {$mv_0^{(i)}$, $mv_1^{(i)}$, $mv_2^{(i)}$} is set equal to {$mv_0^{(i)*}$, $mv_1^{(i)*}$, $mv_2^{(i)*}$} and the search process continues at Step 2.
7. If $s_i$ is not equal to $s_{min}$, then the search process sets i equal to i+1 and goes back to Step 2. Otherwise, the search process terminates with the output {$mv_0^{(i-1)}$, $mv_0^{(i+1)}$, $mv_2^{(i+1)}$}.

Video encoder 200 and video decoder 300 may be configured to perform a cross search. Cross search is with a cross pattern to refine CPMVs. Its search process is identical to square search, except that the delta motion vectors are defined differently. The delta motion vectors of this search pattern are defined as: dMv={(0,0), (−1,0), (0,−1) (0,1), (1,0)}.

Video encoder 200 and video decoder 300 may be configured to perform a diagonal search. Diagonal search is with a diagonal pattern to refine CPMVs. Its search process is identical to square search, except that the delta motion vectors are defined differently, as follows: dMv={(0,0), (−1,−1), (−1,1), (1,1), (1,−1)}.

Video encoder 200 and video decoder 300 may be configured to perform a diamond search. Diamond search is with a diagonal pattern to refine CPMVs. Its search process is identical to square search, except that the delta motion vectors are defined differently, as follows: dMv={(0,0), (0, 2), (1,1), (2,0), (1,−1), (0,−2), (−1,−1), (−2,0), (−1,1)}.

In another example, the output of diamond search can be used as the input for cross search, and the output of cross search is treated as the final output of the combined search process.

Video encoder 200 and video decoder 300 may be configured to perform a two-pass eight-point search. Two-pass eight-point search is a search process with two search patterns (i.e., cross pattern and diagonal pattern) used conditionally during its search process. Its search process is identical to square search except for Steps 3-5. In Two-pass eight-point search, the dMV comprises two set of delta motion vectors, $dMv_0$={(0,0), (−1,0), (0,−1) (0,1), (1,0)} and $dMv_1$={(−1,−1), (−1,1), (1,1), (1,−1)}. The below shows the difference relative to square search.

1-2. These steps are the same as for a square search.
3. With $s_i$, dMv and $mv_0^{(i)}$, the search subprocess computes the respective template matching cost individually for all of these sets of CPMVs: S={$mv_0^{(i)}+d*s_i$, $mv_1^{(i)}$, $mv_2^{(i)}$, for all d∈$dMv_0$}. This search subprocess can be denoted as $d_0^*=argmin_d\{cost(S_0), cost(S_1), \ldots, cost(S_5)\}$.
   Then, if $d_0^*$ is equal to (0,0), $mv_0^{(i)*}$ is set equal to $mv_0^{(i)}$.
   Otherwise, the subprocess computes the respective template matching cost for S={$mv_0^{(i)}+d*s_i$, $mv_1^{(i)}$, $mv_2^{(i)}$, for all d∈$dMv_1$ ∪ $d_0^*$}, and the best delta motion vector of which is denoted as $d_1^*$. The result is $mv_0^{(i)*}=mv_0^{(i)}+d_1^**s_i$.
4. Similar to Step 3, the search subprocess computes the respective template matching cost for S={$mv_0^{(i)*}$, $mv_1^{(i)}+d*s_i$, $mv_2^{(i)}$, for all d∈$dMv_0$} and, when necessary, then the other S={$mv_0^{(i)*}$, $mv_1^{(i)}+d*s_i$, $mv_2^{(i)}$, for all d∈$dM_1$ ∪ $d_0^*$}. The best searching result is denoted as $mv_1^{(i)*}=mv_1^{(i)}+d_1^**s_i$ (if $d_0^* \neq (0,0)$) or $mv_1^{(i)}$(if $d_0^*=(0,0)$).
5. Similar to Step 3, the search subprocess computes the respective template matching cost for S={$mv_0^{(i)*}$, $mv_1^{(i)*}$, $mv_2^{(i)}+d*s_i$, for all d∈$dMv_0$} and, when necessary, then the other S={$mv_0^{(i)*}$, $mv_1^{(i)}$, $mv_2^{(i)}+d*s_i$, for all d∈$dMv_1$ ∪ $d_0^*$}. The best searching result is denoted as $mv_2^{(i)*}=mv_2^{(i)}+d_1^**s_i$ (if $d_0^* \neq (0,0)$) or $mv_2^{(i)}$ (if $d_0^*=(0,0)$).
6-7. These steps are the same as for a square search.

Video encoder 200 and video decoder 300 may be configured to perform a gradient-based search to update all CPMVs simultaneously. Supposing the initial CPMVs are {$mv_0^{(0)}$, $mv_1^{(0)}$, $mv_2^{(0)}$}, the CPMVs are used to generate reference template block which is used to compute sample-domain gradient values horizontally and vertically and prediction residue (i.e., the delta between current template block and reference template block). Then, these values are used in gradient based search to update the given CPMVs. The new CPMVs, denoted as {$mv_0^{(1)}$, $mv_1^{(1)}$, $mv_2^{(1)}$}, then serves as the input to another iteration of gradient based search. The iteration process may terminate a condition is satisfied. The condition may, for example, be the number of iterations exceeding a pre-defined (or signaled) threshold value or the CPMVs not changing between two iterations.

Video encoder 200 and video decoder 300 may be configured to perform a translational-model search. When all CPMVs happen to be identical before, during, or after the aforementioned search processes applies, all the search process of AffTM terminates, and one of the best CPMVs (e.g., random one since all CPMVs are identical) is used in regular block-based template matching, as described above template matching prediction, as its initial search point for further motion vector refinement.

Video encoder 200 and video decoder 300 may be configured to calculate template matching costs. The template matching cost can be defined (or signaled) as one of the following metrics: SAD, sum of absolute transformed differences (SATD), sum of squared errors (SSE), mean reduced sum of absolute differences (MRSAD), mean reduced sum of absolute transformed differences (MR-SATD). MRSAD can be used conditionally if illumination compensation is used for the currently processing block.

In another example, video encoder 200 and video decoder 300 may assign per-sample weight values to each sample on a template block. For example, for a W×H template block, the per-sample weight value may be denoted as $N*w_{x,y}$ and applied to respective sample $c_{x,y}$ and $p_{x,y}$ of a current block template and a reference block template, where N could be an positive integer (e.g., 1, 2, 3, 4, 5 and so on). The template matching cost may be defined as:

$$N^{-1}*\Sigma_{x,y\in template}(N*w_{x,y}*|c_{x,y}-p_{x,y}|)$$

or $$\Sigma_{x,y\in template}(N*w_{x,y}*|c_{x,y}-p_{x,y}|)$$

for simplification.

When local illumination compensation (LIC) or MRSAD is used, the equations may be:

$$N^{-1}*\Sigma_{x,y\in template}(N*w_{x,y}*|c_{x,y}-p_{x,y}-\Delta_{x,y}|)$$

or $$\Sigma_{x,y\in template}(N*w_{x,y}*|c_{x,y}-p_{x,y}-\Delta_{x,y}|)$$

for simplification. In these equations, $\Delta_{x,y}$ is the mean value of $p_{x,y}$ subtracted by that of $c_{x,y}$ ss(in short, mean($p_{x,y}$)−mean ($c_{x,y}$)). Because the assignment of weight values of left template is the transpose of that of above template, only the assignment of weight values of above template needs to be determined.

In another example, per-sample weight values can be region-based, a template block is split equally into 16 regions and template samples inside a region share a single weight value.

Figure 10:
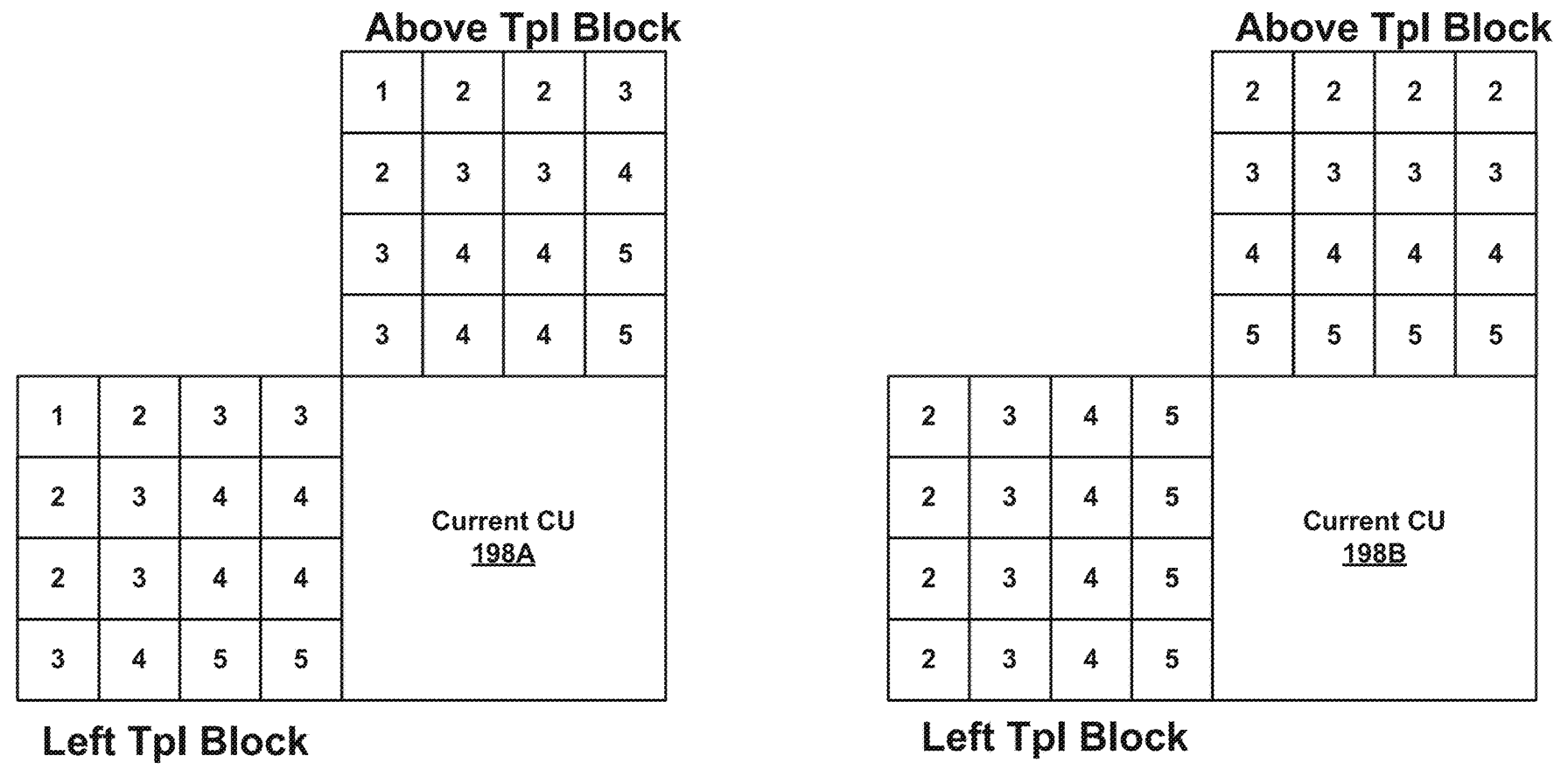

FIG. 10 is a conceptual diagram illustrating examples of per-sample weights that may be assigned to samples of neighboring blocks for calculating template matching costs. In some examples, video encoder 200 and video decoder 300 may assign larger weight values to regions closer to the current block and/or smaller weight values are assigned to regions closer to the top-left corner of the current block. FIG. 10 depicts two examples. In both examples for current CUs 198A and 198B, video encoder 200 and video decoder 300 may assign larger weight values to regions closer to the current block, while for the example of 198A, video encoder 200 and video decoder 300 additionally tunes down the weight values for regions closer to top-left corner of the current block.

In another example, the aforementioned metrics can be added in a weighed manner, as described above template matching prediction, with the delta motion vectors of all CPMVs derived by AffTM.

Video encoder 200 and video decoder 300 may be configured to perform a bi-prediction search process. In some examples, video encoder 200 and video decoder 300 may be configured to refine by AffTM CPMVs corresponding to each reference picture list of a bi-prediction block individually.

In some examples, video encoder 200 and video decoder 300 may be configured to first refine using AffTM CPMVs corresponding to each reference picture list of a bi-prediction block is firstly individually. Then, video encoder 200 and video decoder 300 may additionally refine the CPMVs corresponding to a reference picture list, with those corresponding to the other reference picture list as a prior. For example, video encoder 200 and video decoder 300 may select the bi-prediction weights w for L1 and CPMVs of L1 to be further refined. First, the current template block used during the refinement becomes the weighted delta between the original current template block C and the reference template block $R_0$ corresponding to L0.

$$C'=(C-(1-w)R_0)/w$$

This subtraction process is also referred to as high frequency removal, and C' is used in the same manner as the current template block used during the search process of L1 CPMVs. It is noted that this high frequency removal can perform in the other way around as C'=(C−w $R_0$)/(1−w).

In some examples, video encoder 200 and video decoder 300 may be configured to apply high frequency removal when CPMVs of reference picture list Lx is to be refined, where x can be either 0 or 1. In some examples, video encoder 200 and video decoder 300 may be configured to apply high frequency removal when CPMVs of reference picture list Lx is to be refined, where x can be either 0 or 1. After AffTM performs on CPMVs of Lx, high frequency removal is applied based on CPMVs of Lx and then AffTM can perform on CPMVs of the other reference picture list. This iterative process terminates until none of CPMVs is changed during the search process of AffTM.

In some examples, video encoder 200 and video decoder 300 may be configured to first apply high frequency removal to the CPMVs of Lx depending on the BWC weight value. A rule may a apply. The rule may, for example, be CPMVs of L0 are refined first, when the BCW weight of L0 is larger, or CPMVs of L0 are refined first, when the BCW weight of L0 is smaller.

In some examples, video encoder 200 and video decoder 300 may be configured to first apply high frequency removal to the CPMVs of Lx depending on the ph_mvd_l1_zero_flag flag (which indicates MVD of L1 CPMVs are always zero and may be named differently across video coding standards). A rule may a apply. The rule may, for example, be CPMVs of L0 are refined first, when the flag is true, or CPMVs of L0 are refined first, when the flag is false.

In some examples, video encoder 200 and video decoder 300 may be configured to first refine CPMVs of reference picture list Lx when a template matching cost is higher than that of the other reference picture list as described in the example above.

In some examples, video encoder 200 and video decoder 300 may be configured to first refine CPMVs of reference picture list Lx those CPMVs achieve a template matching cost higher than that of the other reference picture list after the cost based on initial CPMVs is computed respectively for each reference picture list.

In some examples, video encoder 200 and video decoder 300 may be configured to convert bi-prediction CPMVs to uni-prediction CPMVs. After performing AffTM, there are supposed to be two template-matching cost values, $cost_0$ for CPMVs corresponding to L0 and $cost_1$ for those corresponding to L1, before high frequency removal is applied. The third cost value is from the one generated by AffTM after high frequency removal applies. If the third one is higher than one of the other two, then the CPMVs correspond to the reference L0 or L1 is dropped depending on whichever out of $cost_0$ and $cost_1$ is larger.

Video encoder 200 and video decoder 300 may be configured to perform a model conversion from 4- to 6-parameter model. The affine model can be converted from 4-parameter one to 6-parameter. With the coordinate position (that is (0, block height)) of bottom-left corner on the current block, the CPMV of bottom-left corner can be computed based on Eq (2-1). Then, the motion model of current block is treated as 6-parameter affine model for AffTM.

Video encoder 200 and video decoder 300 may be configured to perform a model conversion from translational model to affine model. In some examples, the previously-described AffTM process can be applied on top of the regular block-based template matching in the template matching merge mode, the initial CPMVs are all set equal to the translational MV generated by the template matching process. If the template matching cost of applying the additional AffTM process is less than the cost of regular template matching, the CPMVs of the AffTM process are used for affine motion compensation for the current block instead of the translational motion model from the original template matching process.

In some examples, the conversion is only applied if neither bilateral matching (or Decoder Side Motion Refinement (DMVR) as in VVC) nor the Bidirectional Optical Flow (BDOF) is applied to the current block.

In some examples, video decoder 300 may be configured to always use the 4-parameter affine model as a target conversion model. In some examples, video decoder 300 may be configured to use the 6-parameter affine model as a target conversion model. In some examples, video decoder 300 may determine the final motion model by minimizing the template matching cost.

Figure 11:
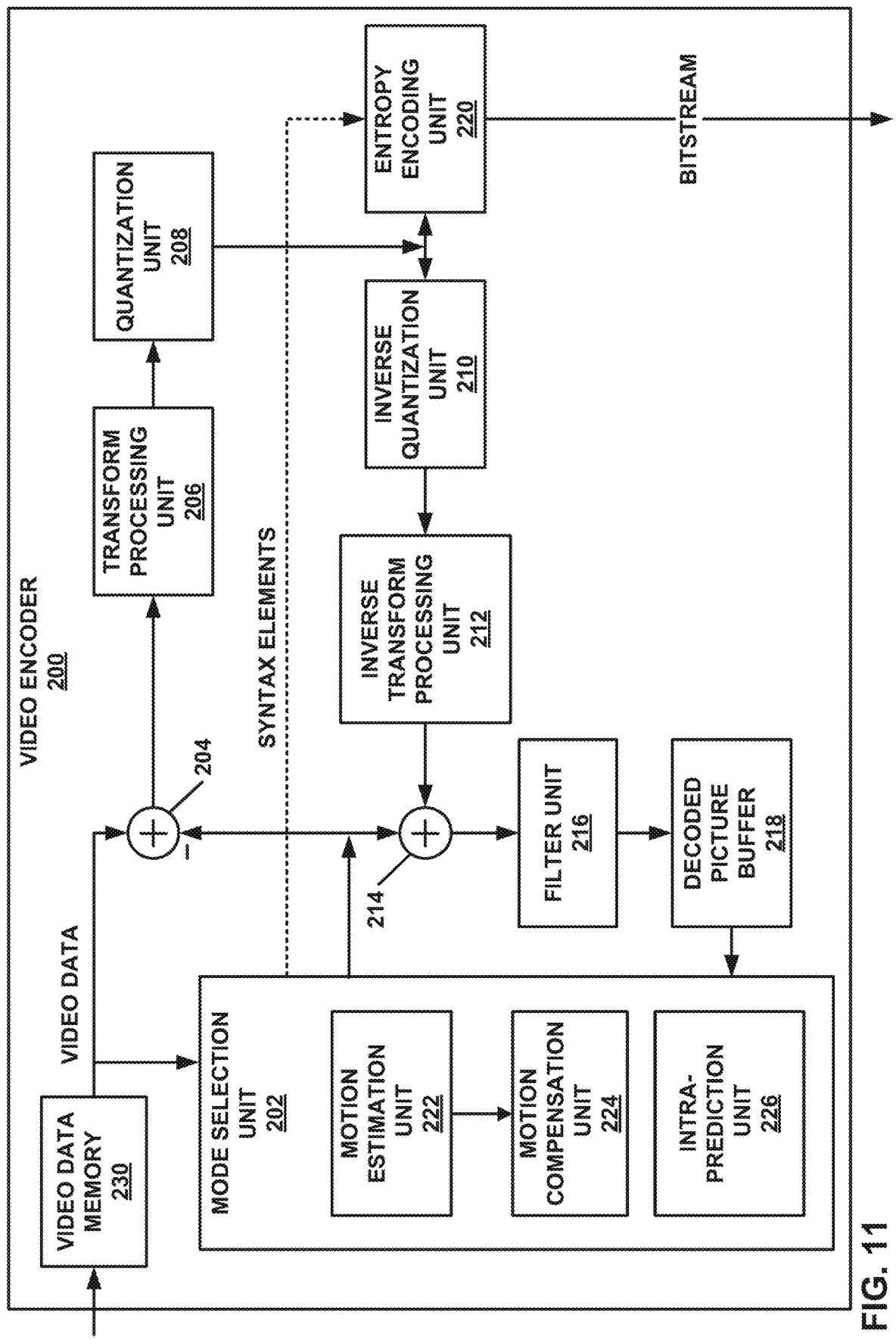
FIG. 11 is a block diagram illustrating an example video encoder that may perform the techniques of this disclosure.

FIG. 11 is a block diagram illustrating an example video encoder 200 that may perform the techniques of this disclosure. FIG. 11 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 11, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 11 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

In accordance with the techniques described herein, motion estimation unit 222 and motion compensation unit 224 may be configured to encode and decode blocks of video data using affine prediction modes. Moreover, motion estimation unit 222 and motion compensation unit 224 may be configured to perform the motion vector refinement processes described herein.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 12:
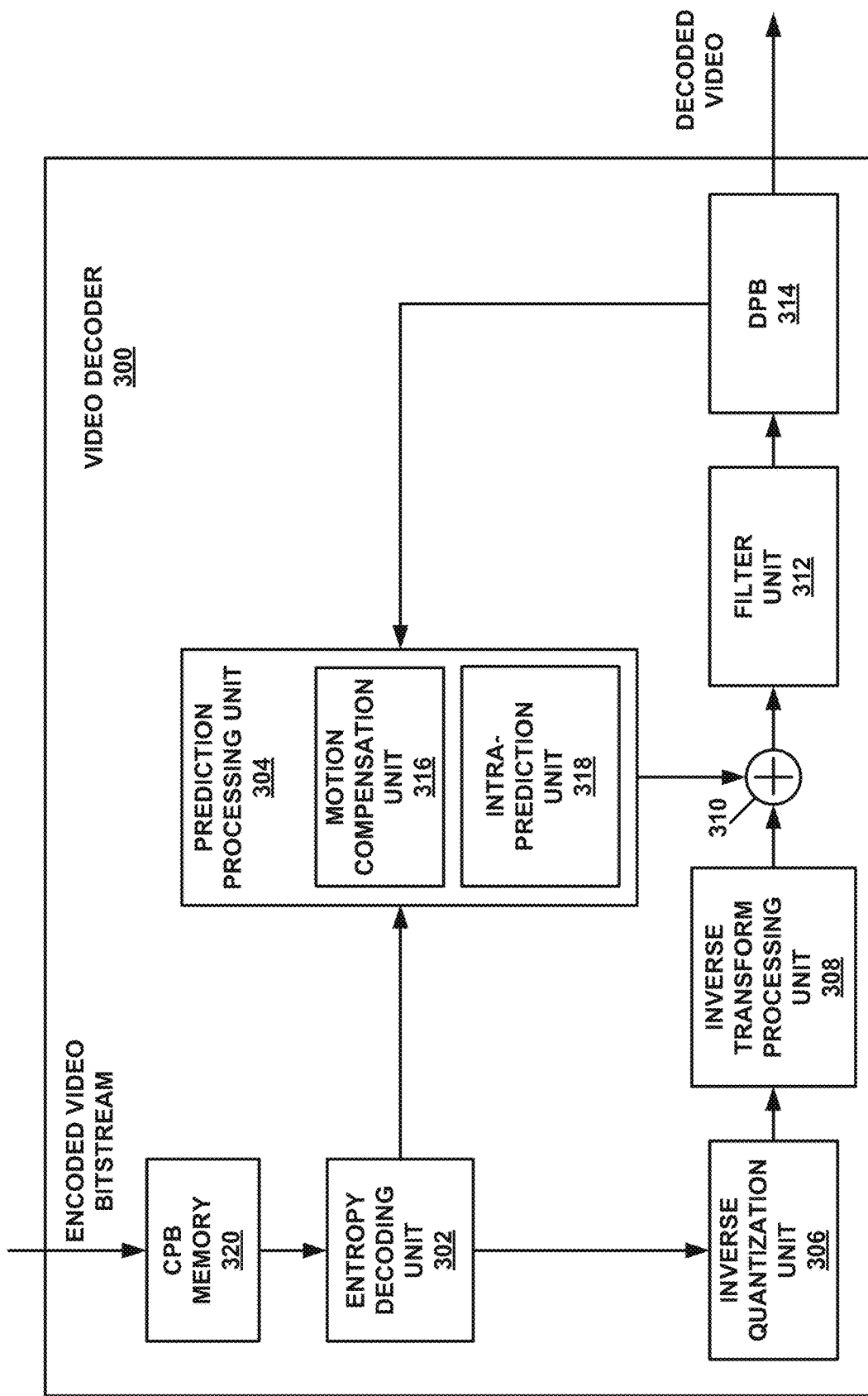
FIG. 12 is a block diagram illustrating an example video decoder that may perform the techniques of this disclosure.

FIG. 12 is a block diagram illustrating an example video decoder 300 that may perform the techniques of this disclosure. FIG. 12 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 12, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 12 are illustrated to assist with understanding the operations performed by video decoder 300. The units may be implemented as fixed-function circuits, programmable circuits, or a combination thereof. Similar to FIG. 11, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 11). In accordance with the techniques described herein, motion compensation unit 316 may be configured to decode blocks of video data using affine prediction modes and may be configured to perform the motion vector refinement processes described herein.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 11). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 13:
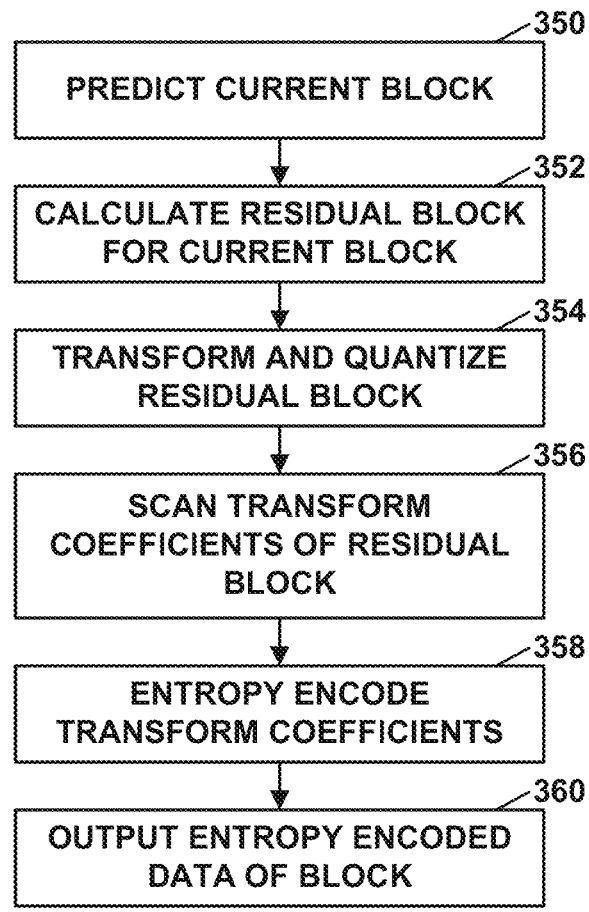
FIG. 13 is a flowchart illustrating an example process for encoding a current block in accordance with the techniques of this disclosure.

FIG. 13 is a flowchart illustrating an example process for encoding a current block in accordance with the techniques of this disclosure. The current block may comprise a current CU. Although described with respect to video encoder 200 (FIGS. 1 and 11), it should be understood that other devices may be configured to perform a process similar to that of FIG. 13.

In this example, video encoder 200 initially predicts the current block (350). For example, video encoder 200 may form a prediction block for the current block using template-based affine prediction, as described in this disclosure. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 14:
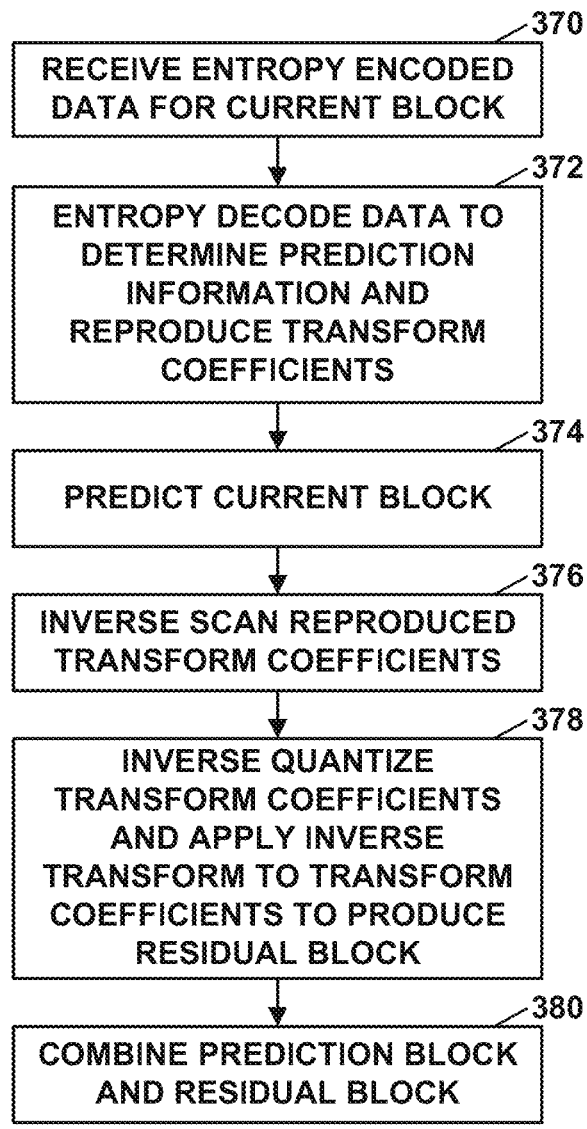
FIG. 14 is a flowchart illustrating an example process for decoding a current block in accordance with the techniques of this disclosure.

FIG. 14 is a flowchart illustrating an example process for decoding a current block of video data in accordance with the techniques of this disclosure. The current block may comprise a current CU. Although described with respect to video decoder 300 (FIGS. 1 and 12), it should be understood that other devices may be configured to perform a process similar to that of FIG. 14.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may, for example, predict the current block using template-based affine prediction as described in this disclosure. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 15:
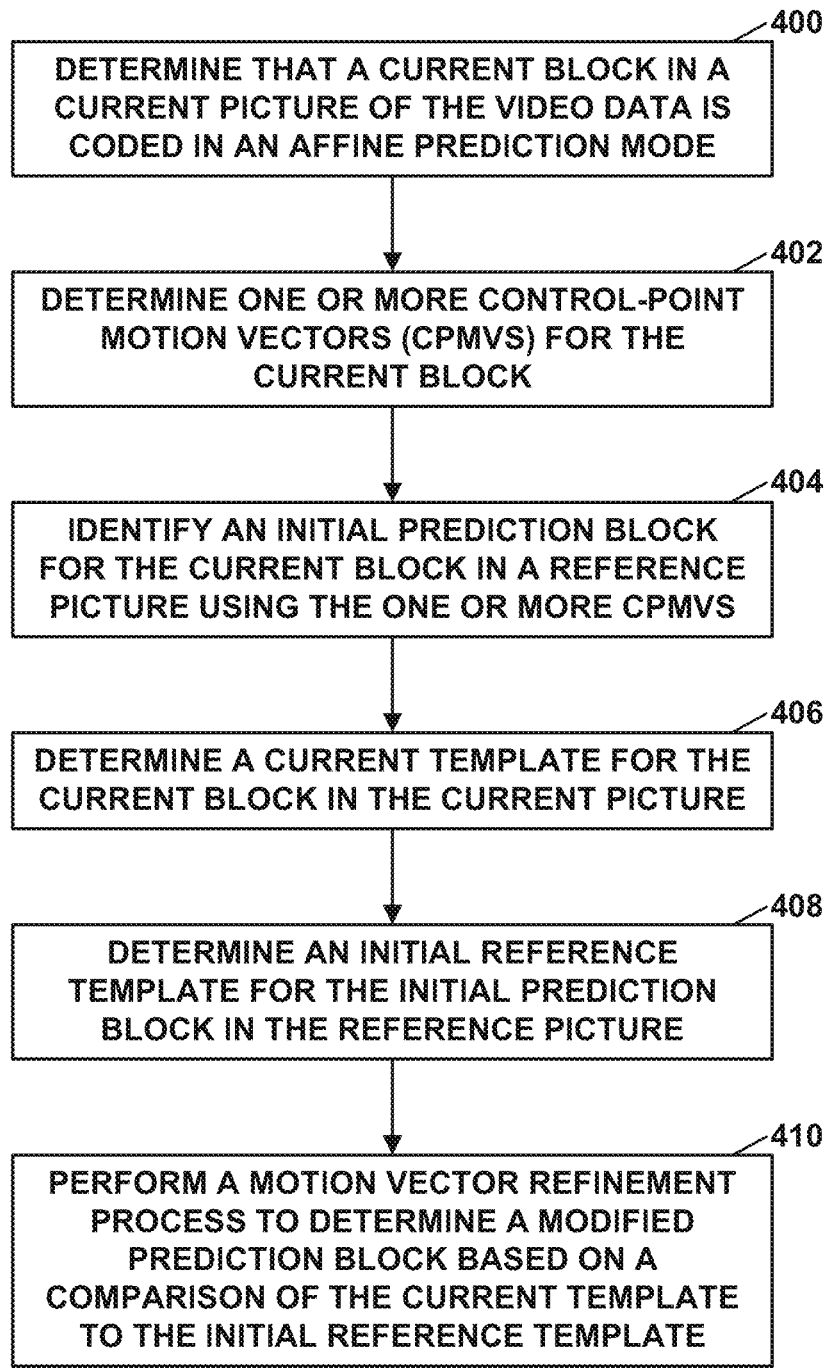
FIG. 15 is a flowchart illustrating an example process for decoding a current block in accordance with the techniques of this disclosure.

FIG. 15 is a flowchart illustrating an example process for decoding a current block of video data in accordance with the techniques of this disclosure. The current block may comprise a current CU. Although described with respect to video decoder 300 (FIGS. 1 and 12), it should be understood that other devices, including video encoders, may be configured to perform a process similar to that of FIG. 15.

Video decoder 300 may determine that a current block in a current picture of the video data is coded in an affine prediction mode (400). The affine prediction mode may, for example, be a 4-parameter affine prediction mode, a 6-parameter affine prediction mode, or some other such affine prediction mode.

Video decoder 300 may determine one or more control-point motion vectors (CPMVs) for the current block (402). Video decoder 300 may identify an initial prediction block for the current block in a reference picture using the one or more CPMVs (404). To identify the initial prediction block of the current block, video decoder 300 may, for example, locate a plurality of sub-blocks in the reference frame using the CPMVs.

Video decoder 300 may determine a current template for the current block in the current picture (406). The current template may include a plurality of sub-blocks located above the current block or to the left of the current block, as illustrated, for example, in FIG. 9A.

Video decoder 300 may determine an initial reference template for the initial prediction block in the reference picture (408). The initial reference template may include a plurality of sub-blocks located above the initial prediction block or to the left of the initial prediction block, as illustrated, for example, in FIGS. 9B and 9C.

Video decoder 300 may perform a motion vector refinement process to determine a modified prediction block based on a comparison of the current template to the initial reference template (410). To perform the motion vector refinement process to determine the modified prediction block further, video decoder 300 may, for example, search within a search area around the initial reference template for a subsequent reference template that matches the current template more closely than the initial reference template. The comparison of the current template to the initial reference template may, for example, be a template matching cost, and video decoder 300 may determine the template matching cost based on a weighted per-sample comparison of samples in the current template to samples in the initial reference template.

Video decoder 300 may determine a prediction block based on the modified prediction block; add the prediction block to a residual block to determine a reconstructed block; apply one or more filtering operations to the reconstructed block; and output a picture of decoded video data that includes the filtered reconstructed block.

The following numbered clauses illustrate one or more aspects of the devices and techniques described in this disclosure.

Clause 1A. A method of decoding video data, the method comprising: determining one or more control-point motion vectors (CPMVs) for a current block, wherein the one or more CPMVs correspond to an initial prediction block for the current block; and performing a motion vector refinement process to determine a modified prediction block.

Clause 2A. The method of clause 1A, wherein the motion vector refinement process comprises performing a template matching process.

Clause 3A. The method of clause 2A, wherein the one or more CPMVs comprises a set of initial CPMVs and the template matching process comprises determining a set of refined CPMVs.

Clause 4A. The method of clause 3A, wherein determining the set of refined CPMVs comprises adding one or more delta motion vector values to the one or more CPMVs to determine the set of refined CPMVs.

Clause 5A. The method of clause 3A or 4A, further comprising: determining a search area based on the one or more CPMVs; and wherein determining the set of refined CPMVs comprises restricting the refined CPMVs to be within the search area.

Clause 6A. The method of any of clauses 3A-5A, further comprising: determining a search pattern; and determining the set of refined CPMVs based on the search pattern.

Clause 7A. The method of any of clauses 1A-6A, wherein performing the motion vector refinement process to determine the modified prediction block comprises performing one or more template matching cost calculations.

Clause 8A. The method of any of clauses 1A-7A, wherein the method of decoding is performed as part of an encoding process.

Clause 9A. A device for decoding video data, the device comprising one or more means for performing the method of any of clauses 1A-8A.

Clause 10A. The device of clause 9A, wherein the one or more means comprise one or more processors implemented in circuitry.

Clause 11A. The device of any of clauses 9A and 10A, further comprising a memory to store the video data.

Clause 12A. The device of any of clauses 9A-11A, further comprising a display configured to display decoded video data.

Clause 13A. The device of any of clauses 9A-12A, wherein the device comprises one or more of a camera, a computer, a mobile device, a broadcast receiver device, or a set-top box.

Clause 14A. The device of any of clauses 9A-13A, wherein the device comprises a video decoder.

Clause 15A. The device of any of clauses 9A-14A, wherein the device comprises a video encoder.

Clause 16A. A computer-readable storage medium having stored thereon instructions that, when executed, cause one or more processors to perform the method of any of clauses 1A-8A.

Clause 1B. A method of decoding video data, the method comprising: determining that a current block in a current picture of the video data is coded in an affine prediction mode; determining one or more control-point motion vectors (CPMVs) for the current block; identifying an initial prediction block for the current block in a reference picture using the one or more CPMVs; determining a current template for the current block in the current picture; determining an initial reference template for the initial prediction block in the reference picture; and performing a motion vector refinement process to determine a modified prediction block based on a comparison of the current template to the initial reference template.

Clause 2B. The method of clause 1B, wherein performing the motion vector refinement process to determine the modified prediction block further comprises: searching within a search area around the initial reference template for a subsequent reference template that matches the current template more closely than the initial reference template.

Clause 3B. The method of clause 1B, wherein the comparison of the current template to the initial reference template comprises a template matching cost.

Clause 4B. The method of clause 3B, further comprising: determining the template matching cost based on a weighted per-sample comparison of samples in the current template to samples in the initial reference template.

Clause 5B. The method of clause 1B, wherein the initial reference template comprises a plurality of sub-blocks located above the initial prediction block or to the left of the initial prediction block.

Clause 6B. The method of clause 1B, wherein the affine prediction mode comprises a 4-parameter affine prediction mode.

Clause 7B. The method of clause 1B, wherein the affine prediction mode comprises a 6-parameter affine prediction mode.

Clause 8B. The method of clause 1B, further comprising: determining a prediction block based on the modified prediction block; adding the prediction block to a residual block to determine a reconstructed block; applying one or more filtering operations to the reconstructed block; and outputting a picture of decoded video data that includes the filtered reconstructed block.

Clause 9B. The method of clause 1B, wherein the method of decoding is performed as part of a video encoding process.

Clause 10B. A device for decoding video data, the device comprising: a memory; and one or more processors implemented in circuitry, coupled to the memory, and configured to: determine that a current block in a current picture of the video data is coded in an affine prediction mode; determine one or more control-point motion vectors (CPMVs) for the current block; identify an initial prediction block for the current block in a reference picture using the one or more CPMVs; determine a current template for the current block in the current picture; determine an initial reference template for the initial prediction block in the reference picture; and perform a motion vector refinement process to determine a modified prediction block based on a comparison of the current template to the initial reference template.

Clause 11B. The device of clause 10B, wherein to perform the motion vector refinement process to determine the modified prediction block further, the one or more processors are further configured to: search within a search area around the initial reference template for a subsequent reference template that matches the current template more closely than the initial reference template.

Clause 12B. The device of clause 10B, wherein the comparison of the current template to the initial reference template comprises a template matching cost.

Clause 13B. The device of clause 12B, wherein the one or more processors are further configured to: determine the template matching cost based on a weighted per-sample comparison of samples in the current template to samples in the initial reference template.

Clause 14B. The device of clause 10B, wherein the initial reference template comprises a plurality of sub-blocks located above the initial prediction block or to the left of the initial prediction block.

Clause 15B. The device of clause 10B, wherein the affine prediction mode comprises a 4-parameter affine prediction mode.

Clause 16B. The device of clause 10B, wherein the affine prediction mode comprises a 6-parameter affine prediction mode.

Clause 17B. The device of clause 10B, wherein the one or more processors are further configured to: determine a prediction block based on the modified prediction block; add the prediction block to a residual block to determine a reconstructed block; apply one or more filtering operations to the reconstructed block; and output a picture of decoded video data that includes the filtered reconstructed block.

Clause 18B. The device of clause 10B, wherein the device comprises a wireless communication device, further comprising a receiver configured to receive encoded video data.

Clause 19B. The device of clause 18B, wherein the wireless communication device comprises a telephone handset and wherein the receiver is configured to demodulate, according to a wireless communication standard, a signal comprising the encoded video data.

Clause 20B. The device of clause 10B, further comprising: a display configured to display decoded video data.

Clause 21B. The device of clause 10B, wherein the device comprises one or more of a camera, a computer, a mobile device, a broadcast receiver device, or a set-top box.

Clause 22B. The device of clause 10B, wherein the device comprises a video encoding devices.

Clause 23B. A computer-readable storage medium storing instructions that when executed by one or more processors cause the one or more processors to: determine that a current block in a current picture of the video data is coded in an affine prediction mode; determine one or more control-point motion vectors (CPMVs) for the current block; identify an initial prediction block for the current block in a reference picture using the one or more CPMVs; determine a current template for the current block in the current picture; determine an initial reference template for the initial prediction block in the reference picture; and perform a motion vector refinement process to determine a modified prediction block based on a comparison of the current template to the initial reference template.

Clause 24B. The computer-readable storage medium of clause 23B, wherein to perform the motion vector refinement process to determine the modified prediction block further, the instructions cause the one or more processors to: search within a search area around the initial reference template for a subsequent reference template that matches the current template more closely than the initial reference template.

Clause 25B. The computer-readable storage medium of clause 23B, wherein the comparison of the current template to the initial reference template comprises a template matching cost.

Clause 26B. The computer-readable storage medium of clause 25B, wherein the instructions cause the one or more processors to: determine the template matching cost based on a weighted per-sample comparison of samples in the current template to samples in the initial reference template.

Clause 27B. The computer-readable storage medium of clause 23B, wherein the initial reference template comprises a plurality of sub-blocks located above the initial prediction block or to the left of the initial prediction block.

Clause 28B. The computer-readable storage medium of clause 23B, wherein the instructions cause the one or more processors to: determine a prediction block based on the modified prediction block; add the prediction block to a residual block to determine a reconstructed block; apply one or more filtering operations to the reconstructed block; and output a picture of decoded video data that includes the filtered reconstructed block.

Clause 29B. An apparatus for decoding video data, the apparatus comprising: means for determining that a current block in a current picture of the video data is coded in an affine prediction mode; means for determining one or more control-point motion vectors (CPMVs) for the current block; means for identifying an initial prediction block for the current block in a reference picture using the one or more CPMVs; means for determining a current template for the current block in the current picture; means for determining an initial reference template for the initial prediction block in the reference picture; and means for performing a motion vector refinement process to determine a modified prediction block based on a comparison of the current template to the initial reference template.

Clause 30B. The apparatus of clause 29B, wherein the comparison of the current template to the initial reference template comprises a template matching cost, the apparatus further comprising: a means for determining the template matching cost based on a weighted per-sample comparison of samples in the current template to samples in the initial reference template.

Clause 1C. A method of decoding video data, the method comprising: determining that a current block in a current picture of the video data is coded in an affine prediction mode; determining one or more control-point motion vectors (CPMVs) for the current block; identifying an initial prediction block for the current block in a reference picture using the one or more CPMVs; determining a current template for the current block in the current picture; determining an initial reference template for the initial prediction block in the reference picture; and performing a motion vector refinement process to determine a modified prediction block based on a comparison of the current template to the initial reference template.

Clause 2C. The method of clause 1C, wherein performing the motion vector refinement process to determine the modified prediction block further comprises: searching within a search area around the initial reference template for a subsequent reference template that matches the current template more closely than the initial reference template.

Clause 3C. The method of clause 1C or 2C, wherein the comparison of the current template to the initial reference template comprises a template matching cost.

Clause 4C. The method of clause 3C, further comprising: determining the template matching cost based on a weighted per-sample comparison of samples in the current template to samples in the initial reference template.

Clause 5C. The method of any of clauses 1C-4C, wherein the initial reference template comprises a plurality of sub-blocks located above the initial prediction block or to the left of the initial prediction block.

Clause 6C. The method of any of clauses 1C-5C, wherein the affine prediction mode comprises a 4-parameter affine prediction mode.

Clause 7C. The method of any of clauses 1C-5C, wherein the affine prediction mode comprises a 6-parameter affine prediction mode.

Clause 8C. The method of any of clauses 1C-7C, further comprising: determining a prediction block based on the modified prediction block; adding the prediction block to a residual block to determine a reconstructed block; applying one or more filtering operations to the reconstructed block; and outputting a picture of decoded video data that includes the filtered reconstructed block.

Clause 9C. The method of any of clauses 1C-8C, wherein the method of decoding is performed as part of a video encoding process.

Clause 10C. A device for decoding video data, the device comprising: a memory; and one or more processors implemented in circuitry, coupled to the memory, and configured to: determine that a current block in a current picture of the video data is coded in an affine prediction mode; determine one or more control-point motion vectors (CPMVs) for the current block; identify an initial prediction block for the current block in a reference picture using the one or more CPMVs; determine a current template for the current block in the current picture; determine an initial reference template for the initial prediction block in the reference picture; and perform a motion vector refinement process to determine a modified prediction block based on a comparison of the current template to the initial reference template.

Clause 11C. The device of clause 10C, wherein to perform the motion vector refinement process to determine the modified prediction block further, the one or more processors are further configured to: search within a search area around the initial reference template for a subsequent reference template that matches the current template more closely than the initial reference template.

Clause 12C. The device of clause 10C or 11C, wherein the comparison of the current template to the initial reference template comprises a template matching cost.

Clause 13C. The device of clause 12C, wherein the one or more processors are further configured to: determine the template matching cost based on a weighted per-sample comparison of samples in the current template to samples in the initial reference template.

Clause 14C. The device of any of clauses 10C-13C, wherein the initial reference template comprises a plurality of sub-blocks located above the initial prediction block or to the left of the initial prediction block.

Clause 15C. The device of any of clauses 10C-14C, wherein the affine prediction mode comprises a 4-parameter affine prediction mode.

Clause 16C. The device of any of clauses 10C-14C, wherein the affine prediction mode comprises a 6-parameter affine prediction mode.

Clause 17C. The device of any of clauses 10C-16C, wherein the one or more processors are further configured to: determine a prediction block based on the modified prediction block; add the prediction block to a residual block to determine a reconstructed block; apply one or more filtering operations to the reconstructed block; and output a picture of decoded video data that includes the filtered reconstructed block.

Clause 18C. The device of any of clauses 10C-17C, wherein the device comprises a wireless communication device, further comprising a receiver configured to receive encoded video data.

Clause 19C. The device of clause 18C, wherein the wireless communication device comprises a telephone handset and wherein the receiver is configured to demodulate, according to a wireless communication standard, a signal comprising the encoded video data.

Clause 20C. The device of any of clauses 10C-19C, further comprising: a display configured to display decoded video data.

Clause 21C. The device of any of clauses 10C-20C, wherein the device comprises one or more of a camera, a computer, a mobile device, a broadcast receiver device, or a set-top box.

Clause 22C. The device of any of clauses 10C-21C, wherein the device comprises a video encoding devices.

Clause 23C. A computer-readable storage medium storing instructions that when executed by one or more processors cause the one or more processors to: determine that a current block in a current picture of the video data is coded in an affine prediction mode; determine one or more control-point motion vectors (CPMVs) for the current block; identify an initial prediction block for the current block in a reference picture using the one or more CPMVs; determine a current template for the current block in the current picture; determine an initial reference template for the initial prediction block in the reference picture; and perform a motion vector refinement process to determine a modified prediction block based on a comparison of the current template to the initial reference template.

Clause 24C. The computer-readable storage medium of clause 23C, wherein to perform the motion vector refinement process to determine the modified prediction block further, the instructions cause the one or more processors to: search within a search area around the initial reference template for a subsequent reference template that matches the current template more closely than the initial reference template.

Clause 25C. The computer-readable storage medium of clause 23C, wherein the comparison of the current template to the initial reference template comprises a template matching cost.

Clause 26C. The computer-readable storage medium of clause 25C, wherein the instructions cause the one or more processors to: determine the template matching cost based on a weighted per-sample comparison of samples in the current template to samples in the initial reference template.

Clause 27C. The computer-readable storage medium of clause 23C, wherein the initial reference template comprises a plurality of sub-blocks located above the initial prediction block or to the left of the initial prediction block.

Clause 28C. The computer-readable storage medium of clause 23C, wherein the instructions cause the one or more processors to: determine a prediction block based on the modified prediction block; add the prediction block to a residual block to determine a reconstructed block; apply one or more filtering operations to the reconstructed block; and output a picture of decoded video data that includes the filtered reconstructed block.

Clause 29C. An apparatus for decoding video data, the apparatus comprising: means for determining that a current block in a current picture of the video data is coded in an affine prediction mode; means for determining one or more control-point motion vectors (CPMVs) for the current block; means for identifying an initial prediction block for the current block in a reference picture using the one or more CPMVs; means for determining a current template for the current block in the current picture; means for determining an initial reference template for the initial prediction block in the reference picture; and means for performing a motion vector refinement process to determine a modified prediction block based on a comparison of the current template to the initial reference template.

Clause 30C. The apparatus of clause 29C, wherein the comparison of the current template to the initial reference template comprises a template matching cost, the apparatus further comprising: a means for determining the template matching cost based on a weighted per-sample comparison of samples in the current template to samples in the initial reference template.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that a current block in a current picture of the video data is coded in an affine prediction mode, wherein the current block comprises a coding unit including a first plurality of sub-blocks;
   determining one or more control-point motion vectors (CPMVs) for the current block;
   determining for each of the first plurality of sub-blocks, a respective motion vector based on the CPMVs;
   identifying an initial prediction block for the current block in a reference picture using the one or more CPMVs, wherein the initial prediction block comprises a plurality of prediction sub-blocks, and wherein identifying the initial prediction block comprises identifying, for each sub-block of the first plurality of sub-blocks, a corresponding prediction sub-block of the plurality of prediction sub-blocks based on the respective motion vector of the sub-block;
   determining a current template for the current block in the current picture, wherein the current template corresponds to a second plurality of sub-blocks that are neighboring blocks of the first plurality of sub-blocks;
   determining an initial reference template for the initial prediction block in the reference picture, wherein the initial reference template corresponds to a third plurality of sub-blocks that are neighboring blocks of the corresponding prediction sub-blocks; and
   performing a motion vector refinement process to determine a modified prediction block based on a comparison of the current template to the initial reference template.

2. The method of claim 1, wherein performing the motion vector refinement process to determine the modified prediction block further comprises:
   searching within a search area around the initial reference template for a subsequent reference template that matches the current template more closely than the initial reference template.

3. The method of claim 1, wherein the comparison of the current template to the initial reference template comprises a template matching cost.

4. The method of claim 3, further comprising:
   determining the template matching cost based on a weighted per-sample comparison of samples in the current template to samples in the initial reference template.

5. The method of claim 1, wherein the initial reference template comprises a plurality of sub-blocks located above the initial prediction block or to the left of the initial prediction block.

6. The method of claim 1, wherein the affine prediction mode comprises a 4-parameter affine prediction mode.

7. The method of claim 1, wherein the affine prediction mode comprises a 6-parameter affine prediction mode.

8. The method of claim 1, further comprising:
determining a prediction block based on the modified prediction block;
adding the prediction block to a residual block to determine a reconstructed block;
applying one or more filtering operations to the reconstructed block; and
outputting a picture of decoded video data that includes the filtered reconstructed block.

9. The method of claim 1, wherein the method of decoding is performed as part of a video encoding process.

10. A device for decoding video data, the device comprising:
a memory; and
one or more processors implemented in circuitry, coupled to the memory, and configured to:
determine that a current block in a current picture of the video data is coded in an affine prediction mode, wherein the current block comprises a coding unit including a first plurality of sub-blocks;
determine one or more control-point motion vectors (CPMVs) for the current block;
determine for each of the first plurality of sub-blocks, a respective motion vector based on the CPMVs;
identify an initial prediction block for the current block in a reference picture using the one or more CPMVs, wherein the initial prediction block comprises a plurality of prediction sub-blocks, and wherein identifying the initial prediction block comprises identifying, for each sub-block of the first plurality of sub-blocks, a corresponding prediction sub-block of the plurality of prediction sub-blocks based on the respective motion vector of the sub-block;
determine a current template for the current block in the current picture, wherein the current template corresponds to a second plurality of sub-blocks that are neighboring blocks of the first plurality of sub-blocks;
determine an initial reference template for the initial prediction block in the reference picture, wherein the initial reference template corresponds to a third plurality of sub-blocks that are neighboring blocks of the corresponding prediction sub-blocks; and
perform a motion vector refinement process to determine a modified prediction block based on a comparison of the current template to the initial reference template.

11. The device of claim 10, wherein to perform the motion vector refinement process to determine the modified prediction block further, the one or more processors are further configured to:
search within a search area around the initial reference template for a subsequent reference template that matches the current template more closely than the initial reference template.

12. The device of claim 10, wherein the comparison of the current template to the initial reference template comprises a template matching cost.

13. The device of claim 12, wherein the one or more processors are further configured to:
determine the template matching cost based on a weighted per-sample comparison of samples in the current template to samples in the initial reference template.

14. The device of claim 10, wherein the initial reference template comprises a plurality of sub-blocks located above the initial prediction block or to the left of the initial prediction block.

15. The device of claim 10, wherein the affine prediction mode comprises a 4-parameter affine prediction mode.

16. The device of claim 10, wherein the affine prediction mode comprises a 6-parameter affine prediction mode.

17. The device of claim 10, wherein the one or more processors are further configured to:
determine a prediction block based on the modified prediction block;
add the prediction block to a residual block to determine a reconstructed block;
apply one or more filtering operations to the reconstructed block; and
output a picture of decoded video data that includes the filtered reconstructed block.

18. The device of claim 10, wherein the device comprises a wireless communication device, further comprising a receiver configured to receive encoded video data.

19. The device of claim 18, wherein the wireless communication device comprises a telephone handset and wherein the receiver is configured to demodulate, according to a wireless communication standard, a signal comprising the encoded video data.

20. The device of claim 10, further comprising:
a display configured to display decoded video data.

21. The device of claim 10, wherein the device comprises one or more of a camera, a computer, a mobile device, a broadcast receiver device, or a set-top box.

22. The device of claim 10, wherein the device comprises a video encoding devices.

23. A non-transitory computer-readable storage medium storing instructions that when executed by one or more processors cause the one or more processors to:
determine that a current block in a current picture of the video data is coded in an affine prediction mode, wherein the current block comprises a coding unit including a first plurality of sub-blocks;
determine one or more control-point motion vectors (CPMVs) for the current block;
determine for each of the first plurality of sub-blocks, a respective motion vector based on the CPMVs;
identify an initial prediction block for the current block in a reference picture using the one or more CPMVs, wherein the initial prediction block comprises a plurality of prediction sub-blocks, and wherein identifying the initial prediction block comprises identifying, for each sub-block of the first plurality of sub-blocks, a corresponding prediction sub-block of the plurality of prediction sub-blocks based on the respective motion vector of the sub-block;
determine a current template for the current block in the current picture, wherein the current template corresponds to a second plurality of sub-blocks that are neighboring blocks of the first plurality of sub-blocks;
determine an initial reference template for the initial prediction block in the reference picture, wherein the initial reference template corresponds to a third plurality of sub-blocks that are neighboring blocks of the corresponding prediction sub-blocks; and perform a motion vector refinement process to determine a modified prediction block based on a comparison of the current template to the initial reference template.

24. The non-transitory computer-readable storage medium of claim 23, wherein to perform the motion vector refinement process to determine the modified prediction block further, the instructions cause the one or more processors to:
search within a search area around the initial reference template for a subsequent reference template that matches the current template more closely than the initial reference template.

25. The non-transitory computer-readable storage medium of claim 23, wherein the comparison of the current template to the initial reference template comprises a template matching cost.

26. The non-transitory computer-readable storage medium of claim 25, wherein the instructions cause the one or more processors to:
determine the template matching cost based on a weighted per-sample comparison of samples in the current template to samples in the initial reference template.

27. The non-transitory computer-readable storage medium of claim 23, wherein the initial reference template comprises a plurality of sub-blocks located above the initial prediction block or to the left of the initial prediction block.

28. The non-transitory computer-readable storage medium of claim 23, wherein the instructions cause the one or more processors to:
determine a prediction block based on the modified prediction block;
add the prediction block to a residual block to determine a reconstructed block;
apply one or more filtering operations to the reconstructed block; and
output a picture of decoded video data that includes the filtered reconstructed block.

29. An apparatus for decoding video data, the apparatus comprising:
means for determining that a current block in a current picture of the video data is coded in an affine prediction mode, wherein the current block comprises a coding unit including a first plurality of sub-blocks;
means for determining one or more control-point motion vectors (CPMVs) for the current block;
means for determining for each of the first plurality of sub-blocks, a respective motion vector based on the CPMVs,
means for identifying an initial prediction block for the current block in a reference picture using the one or more CPMVs, wherein the initial prediction block comprises a plurality of prediction sub-blocks, and wherein identifying the initial prediction block comprises identifying, for each sub-block of the first plurality of sub-blocks, a corresponding prediction sub-block of the plurality of prediction sub-blocks based on the respective motion vector of the sub-block;
means for determining a current template for the current block in the current picture, wherein the current template corresponds to a second plurality of sub-blocks that are neighboring blocks of the first plurality of sub-blocks;
means for determining an initial reference template for the initial prediction block in the reference picture, wherein the initial reference template corresponds to a third plurality of sub-blocks that are neighboring blocks of the corresponding prediction sub-blocks; and
means for performing a motion vector refinement process to determine a modified prediction block based on a comparison of the current template to the initial reference template.

30. The apparatus of claim 29, wherein the comparison of the current template to the initial reference template comprises a template matching cost, the apparatus further comprising:
a means for determining the template matching cost based on a weighted per-sample comparison of samples in the current template to samples in the initial reference template.

* * * * *